(12) United States Patent
Baur et al.

(10) Patent No.: US 7,630,022 B1
(45) Date of Patent: Dec. 8, 2009

(54) ADVANCED LIQUID CRYSTAL TUNABLE FILTERS AND METHOD

(76) Inventors: Thomas Baur, 51838 County Road 51, Ault, CO (US) 80610; Joel R. Blum, 3016 E. 109th Ave., Northglenn, CO (US) 80233; Paul A. Searcy, 1674 Stardance Cir., Longmont, CO (US) 80501

(*) Notice: Subject to any disclaimer, the term of this patent is extended or adjusted under 35 U.S.C. 154(b) by 296 days.

(21) Appl. No.: 11/524,987

(22) Filed: Sep. 20, 2006

Related U.S. Application Data

(60) Provisional application No. 60/718,857, filed on Sep. 20, 2005.

(51) Int. Cl.
G02F 1/1335 (2006.01)
G02F 1/07 (2006.01)

(52) U.S. Cl. ............... 349/18; 349/61; 349/96; 349/117; 349/119

(58) Field of Classification Search ............ 349/18, 349/61, 97, 106, 117, 119
See application file for complete search history.

(56) References Cited

U.S. PATENT DOCUMENTS 5,231,521 A * 7/1993 Johnson et al. ............ 349/18
7,362,489 B2 * 4/2008 Wang et al. ............ 359/245
2008/0007813 A1 * 1/2008 Wang et al. ............ 359/245

* cited by examiner

Primary Examiner—Frank G Font
Assistant Examiner—Eric Wong
(74) Attorney, Agent, or Firm—Pritzkau Patent Group LLC

(57) ABSTRACT

A birefringent optical filter and associated method are described which demonstrate improved performance for both fixed and tunable filter configurations. One exemplary embodiment involves an initial filter configuration, having an output polarizer, that exhibits an initial spectral filter response having an undesired transmission feature and a desired transmission feature. An additional polarizer follows the output polarizer and an adjustable retarder is disposed directly between the output polarizer and the additional polarizer to produce an overall spectral filter response that eliminates the undesired transmission feature, while passing the desired transmission feature. Another exemplary embodiment uses at least one reflective polarizer for passing light along the filter optical path, which light is characterized by a selected polarization, and for reflecting a rejected light that is characterized by a different polarization such that the rejected light is directed out of the optical path.

55 Claims, 11 Drawing Sheets

ADVANCED LIQUID CRYSTAL TUNABLE FILTERS AND METHOD

RELATED APPLICATION

The present application claims priority from U.S. Provisional Patent Application Ser. No. 60/718,857, filed on Sep. 20, 2005 which is incorporated herein by reference in its entirety.

BACKGROUND

The present invention is generally related to the field of optical filters and, more particularly, to the field of birefringent optical filters that may include tunable elements.

Optical birefringent filters are employed in many applications including spectroscopy, fiber optics, imaging, and display technologies. An optical birefringent filter consists of a number of birefringent elements, or "retarders", disposed between a number of polarizers. The birefringent elements are retarders having fixed retardance, variable retarders such as liquid crystal (LC) retarders having adjustable retardance, or combinations of the two.

A generic, single stage filter usually consists of two crossed or parallel polarizers which serve as an input polarizer and an output polarizer, both oriented transverse to an optical axis, with birefringent elements disposed in between them along the optical axis. The input polarizer acts to establish a polarization axis with linear polarization state at the filter input, and the birefringent elements transform the polarization state as it propagates from input to output; the transformation is frequency dependent so that all light incident on the output polarizer exhibits a wavelength dependent polarization state. The output polarizer then rejects all propagating wavelengths with polarization angles that do not match the polarization axis of the output polarizer, thus creating a spectral filter response exhibiting performance that can be characterized by defined specifications. Although the example just given for a single stage filter suggests using linear polarizers, any suitable type of polarizer may be used including, for example, circular or elliptical polarizers. Also, although the example uses parallel or orthogonal polarizers this is not a requirement. The specifications used to define birefringent filters are defined identically to those used to characterize common Fabry-Perot filters including: free spectral range (FSR), the distance between transmission peaks; linewidth defined as full line width half maximum (FWHM); and finesse, the number of FWHM line widths between adjacent peaks.

Retarders are birefringent in that each of two axes has a different index of refraction for linearly polarized light so that, at a given wavelength, light polarized along one axis travels faster than the same light polarized along the other axis. A polarized wave, entering the retarder and having components along both retarder axes, will exit the retarder in an altered polarization state. For example, in the simple case of a "half wave" retarder, incident light, linearly polarized at 45 degrees from either axis, exits the retarder still linearly polarized but rotated 90 degrees from the input polarization direction.

Fixed retarders, or "waveplates", are characterized at a specific wavelength by a parameter retardance. This is the delay, expressed commonly in distance units, of the wave polarized along the "slow" axis relative to the wave component polarized along the second axis, which is called the "fast" axis. The retardance of a waveplate is characterized by another parameter called order. The order m is the number of full waves of retardance that will be experienced by a wave at the specified wavelength. Usually, a retarder will not retard by an integral number of waves and it is the fractional wave shift in addition to the m waves that determines the polarization state of the light leaving the retarder. Thus, at a particular wavelength, a third order half wave plate generates three full waves of retardance plus a half wave of retardance.

The comb-like response typical of birefringent filters incorporating high retardance elements, or retardance elements of high order, can be understood by appreciating that a propagating polarized signal may be retarded by multiple waves before arriving at the output polarizer in the "correct" polarization for transmission. It follows that multiple separate wavelengths may each undergo different numbers of full and fractional waves of retardance and still pass through the output polarizer. A given transmission peak of a filter stage, at a given wavelength, is defined by an order m corresponding to the number of waves of retardance experienced while passing through the stage. Thus a fifth order peak corresponds to five waves, a first order peak corresponds to one wave.

In particular, a filter stage having a thick waveplate with high retardance, may exhibit a comb-like response with peaks of multiple orders across the passband of the polarizers. The same polarizers combined with a thin waveplate, having low retardance, may exhibit as little as one first order peak within the same polarizer-limited optical bandwidth. If the plate is made thinner yet, the filter would exhibit no peaks within the operable polarizer range.

Multi-stage filters can be constructed by combining successive single stage filters along a common optical axis, and the multi-stage response is determined by the product of the responses of the individual stages. It is common practice in the prior art to create a multi-stage filter with shared polarizers between adjacent stages, each intermediate polarizer acting as an output polarizer for a given stage, and as an input polarizer for the next stage. One common desire in combining multiple stages is to provide a filter response having "high finesse" which is a loose qualitative term meaning that the spacing between adjacent lines is a large multiple of overall filter response linewidth.

Referring to FIG. 1, the above discussion is illustrated by considering the prior art example of a classic multi-stage Lyot filter, generally indicated by reference number 100. A single Lyot filter stage typically includes a single birefringent element spanned by two linear polarizers in either a parallel or a crossed orientation. FIG. 1 shows a four stage filter, each containing one of a group of four retarder elements 102, 104, 106 and 108 respectively, which are disposed between an input polarizer 110 and an output polarizer 112. The orientations of all the elements are indicated by a group of arrows and angles 114. The angles are defined azimuthally, relative to an observer positioned at the output sighting down the center of the filter towards the input. The polarization axes, of the polarizers in this example, are aligned in mutually parallel orientation. An input light 116 enters the filter at the input polarizer and an output light 118 exits the filter at the output polarizer.

Considering now FIG. 2 in conjunction with FIG. 1, a series of plots 202, 204, 206 and 208, corresponding to individual responses of the first through the fourth stages, respectively, display transmission for each stage of FIG. 1 as a function of wavelength. A last plot 210 shows the response exhibited by the overall filter output having a first transmission peak 212 and a second transmission peak 214. Each of the first three stages is configured to include multiple transmission peaks wherein two peaks from each individual stage response at least approximately line up with a pair of peaks 216 and 218 present in last stage response 208. It should be appreciated that the overall filter response is a result of multiplying all four of the individual filter stage responses at each and every point in the range of wavelengths. Therefore, those peaks that are mutually aligned in all four stages, multiply with three other peaks, from three other stages, to produce first overall transmission peak 212 and second overall transmission peak 214. The stages are cooperatively configured, by design, such that light at the wavelength of any peak, in the first three stages, that is not lined up with third stage peaks 216 and 218 is at least approximately eliminated before reaching the overall filter stage output.

Still referring to FIG. 2, it is noted that the first stage exhibits narrow lines having a low FWHM line width 220 that is illustrated between an opposing pair of arrows for an arbitrary one of the peaks in Stage 1, with the lines spaced closely, so as to correspond to a low FSR 222, likewise indicated between a pair of arrows between arbitrary adjacent peaks. The last stage exhibits wide lines having a high FWHM 224, that are widely spaced with a large FSR 226. It should be appreciated that, while no single Lyot stage combines narrow FWHM lines with high FSR, the overall output response does combine a high FSR with a low FWHM 228, and therefore overall filter response 210 exhibits widely spaced narrow lines in a response characterized as having high finesse. It should be appreciated that the term of art "high finesse", is not exact, and generally refers to a line spacing wherein the lines are spaced apart by many line widths. It is noted here that "transmission peaks" may be referred to hereinafter as "lines", "peaks" or "transmission features".

Attention is now directed to FIG. 3, which depicts a classic single stage Solc filter generally indicated by the reference number 300 having three identical retarders 302 disposed between an input polarizer 304 and output polarizer 306. As in the example above, the azimuthal orientations of the elements are indicated by a set of arrows 308 as seen from the output. This is a so called "parallel" Solc stage, meaning that the input polarizer and the output polarizer are aligned in mutually parallel orientations. Generally, in parallel Solc stages, the retarders are each substantially identical and they are arranged in a so called fan configuration whereby the fast axes of each retarder are oriented at successively increasing angles. For instance, the classic 3-element Solc filter, shown here, includes parallel polarizers with their respective fast axes rotated by 15, 45, and 75 degrees relative to the input polarization axis.

The above example relates to a parallel Solc type filter stage. Another example known in the art is a crossed polarizer Solc filter, having input and output polarizers oriented at 90 degrees. This latter configuration has multiple identical waveplates oriented in a so called "folded" configuration with each successive waveplate alternatively aligned at $+\theta$ and $-\theta$ with respect to the input polarization axis.

It is known in the art that mutually parallel Solc stages can be combined to form multi-stage birefringent optical filters exhibiting properties similar to those of the multi-stage Lyot filter discussed above. It is further known that successive crossed Solc stages can be similarly combined, also with similar results. Also a filter can include a combination of crossed polarizer and parallel polarizer Solc stages.

It is still further known in the art that single and multi-stage birefringent filters can be rendered at least partially tunable by selectively replacing fixed retarders with adjustable retarders such as, for example, electrically controlled LC retarders. In the approach that is most straightforward, at least from a conceptual standpoint, all adjustable retarders are swept in unison, and all stages should be simultaneously tuned so as to continuously maintain mutual wavelength-alignment throughout a frequency sweep. This "brute force" method is, in principle, straightforward to design and implement when it is reasonably possible to acquire reasonably compact optically low loss adjustable retarders with adequately large range of retardance adjustment.

In fact, it should be appreciated that adjustable retarders that are known in the art, for example electronically controlled LC retarders, typically have a limited tuning range that is often insufficient to enable the brute force tuning method described above. Therefore, the design of practical tunable multi-stage filters using LC retarders is generally not a simple matter of removing fixed waveplates and then replacing them with adjustable retarders. Such an over-simplistic approach would be inadequate in many, if not most applications, and the previous examples, while useful for illustrating basic operating principles, do not address many of the issues that arise in designing modern electrically tunable filters, given real-world constraints. For example, the largest practical retardance for a liquid crystal variable retarder is less than four thousand nanometers and many filters require a total retardance of each retarder element of more than 100,000 nanometers.

It is a common desire in multi stage adjustable filter design to minimize the number of stages, as well as the number of elements, while achieving the desired tuning range with a high finesse. There are multiple advantages to achieving the desired performance with the minimum number of polarizers including: reduced cost; higher optical throughput; reduced size.

One recent example, relating to LC tunable multi-stage Solc filters, addresses this by methods, known in the art, which may be referred to hereinafter as "peak hopping". Recall that for a multi-stage filter to operate in stationary state with a narrow line and high finesse, as in multi stage Lyot example above, all the stages must have peaks aligned to the wavelength of the desired filter line. Therefore it is not necessary to tune each stage across a full filter range while sweeping the overall filter response. At any given stationary state, all that matters is that one peak of each stage aligns with a desired transmission feature of a filter response; it is not necessary for one peak to follow the output wavelength across an entire tunable range. Every stage therefore requires just enough tuning range—at least at a minimum—so that one peak of each stage can be tuned to the desired filter response wavelength. The filter can be incrementally shifted through a series of states of the overall filter response approximately corresponding to a continuous range of wavelengths throughout the range of the overall filter response. The higher the order of a stage, the smaller the absolute wavelength tuning range needed to achieve this. A transmission peak corresponding to a retardance of m waves requires a retardance change of approximately m times a wavelength shift to achieve that wavelength shift in the peak wavelength. It should be appreciated that this reduces the tuning range requirements, especially for the adjustable retarder elements within the stages containing higher order retarders.

With the foregoing in mind, a filter controller can establish a cooperative response of multiple stages to achieve a desired overall response. It should be appreciated that the mechanism for establishing a cooperative "peak hopping" response is accompanied by increased complexity in the problem of filter design, since a given response can at least approximately be obtained by multiple filter states. This fact adds to the complexity of design decisions as well as control algorithms. As the number of stages increases, the number of elements increases, and the range of possible component combinations and corresponding implications to control and performance increases, and optimization of filter design becomes more difficult.

Aside from general complexity, a commonly known challenge in design of liquid crystal tunable multiple Solc stage filters is to provide a high finesse response tunable over the entire response range of the associated detector. In many applications, it is necessary to utilize an optical filter system of high finesse, and in fact some applications desire a tunable optical filter exhibiting a single line response tunable over the entire range of whatever electro-optic detector is employed in that application. In many cases, it is not practical using state-of-the-art technology to achieve the necessary finesse over the necessary wavelength range using known birefringent filter technology.

In view of the complexity that is inherent in widely tunable multi-stage birefringent filters, particularly the challenge of generating a high finesse response over a wide optical bandwidth, it is submitted that there remains a need for improved filter designs, in particular there is an unfulfilled need for specific filter stages that provide desired features, functionality, or enhancements to filter response.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a birefringent optical filter and associated method are described which demonstrate improved performance for both fixed and tunable filter configurations.

One embodiment involves, by way of example, a multi-stage birefringent optical filter and associated method for producing an overall light output signal from an input light. In this filter, an arrangement of optical elements is provided, including a plurality of polarizers, each having a polarization axis, with one of the polarizers serving as an input polarizer and another one of the polarizers serving as an output polarizer. The polarization axis of the output polarizer is in a given orientation, and at least one retarder element is positioned between the input polarizer and the output polarizer such that the arrangement of optical elements cooperates to define an optical path along which at least input light travels from an optical input to an initial optical output to exhibit an initial spectral filter response which produces an initial optical output that exhibits an undesired transmission feature and a desired transmission feature. An additional polarizer follows the output polarizer. The additional polarizer includes an additional polarization axis that is oriented at least approximately orthogonal to the given orientation. A retarder, as a sole optical element, is disposed directly between the output polarizer and the additional polarizer to cooperate with the output polarizer and the additional polarizer, as an add-on stage, to receive the initial optical output from the optical path and to produce therefrom an overall spectral filter response that at least generally eliminates the undesired transmission feature from the overall light output signal, while passing the desired transmission feature. The retarder can be fixed, adjustable or some combination thereof.

In one feature, a multi-stage birefringent optical filter, according to this disclosure, can be used in a system with an electro-optic detector having a given detection range of operation, in wavelength. In this instance, the multi-stage filter can be configured for selectively moving a first transmission peak and a second transmission peak across the given detection range. The output polarizer, the adjustable retarder and the additional polarizer cooperate, as the add-on stage, to produce an add-on spectral filter response that operates to pass the desired transmission feature at an add-on stage transmission peak of the add-on spectral filter response and to attenuate the undesired transmission feature at least approximately at a minimum of the add-on spectral filter response, for any given position of the desired transmission feature, and the add-on stage is operable over the given detection range of operation such that the desired transmission feature is adjustably tunable thereacross, while substantially eliminating the undesired transmission feature to selectively, spectrally align the add-on spectral filter response with the initial spectral filter response.

Another exemplary embodiment involves a birefringent optical filter and associated method having an arrangement of optical elements including a plurality of polarizers with one of the polarizers serving as an input polarizer and another one of the polarizers serving as an output polarizer and at least one retarder element positioned between the input polarizer and the output polarizer such that the arrangement of optical elements cooperates to define an optical path along which at least input light travels from an optical input to an optical output to produce an output light. At least one reflective polarizer, serving as one of the plurality of polarizers, is arranged in the optical path for passing light along the optical path, which light is characterized by a selected polarization, and for reflecting a rejected light that is characterized by a different polarization such that the rejected light is directed out of the optical path.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

Figure 1:
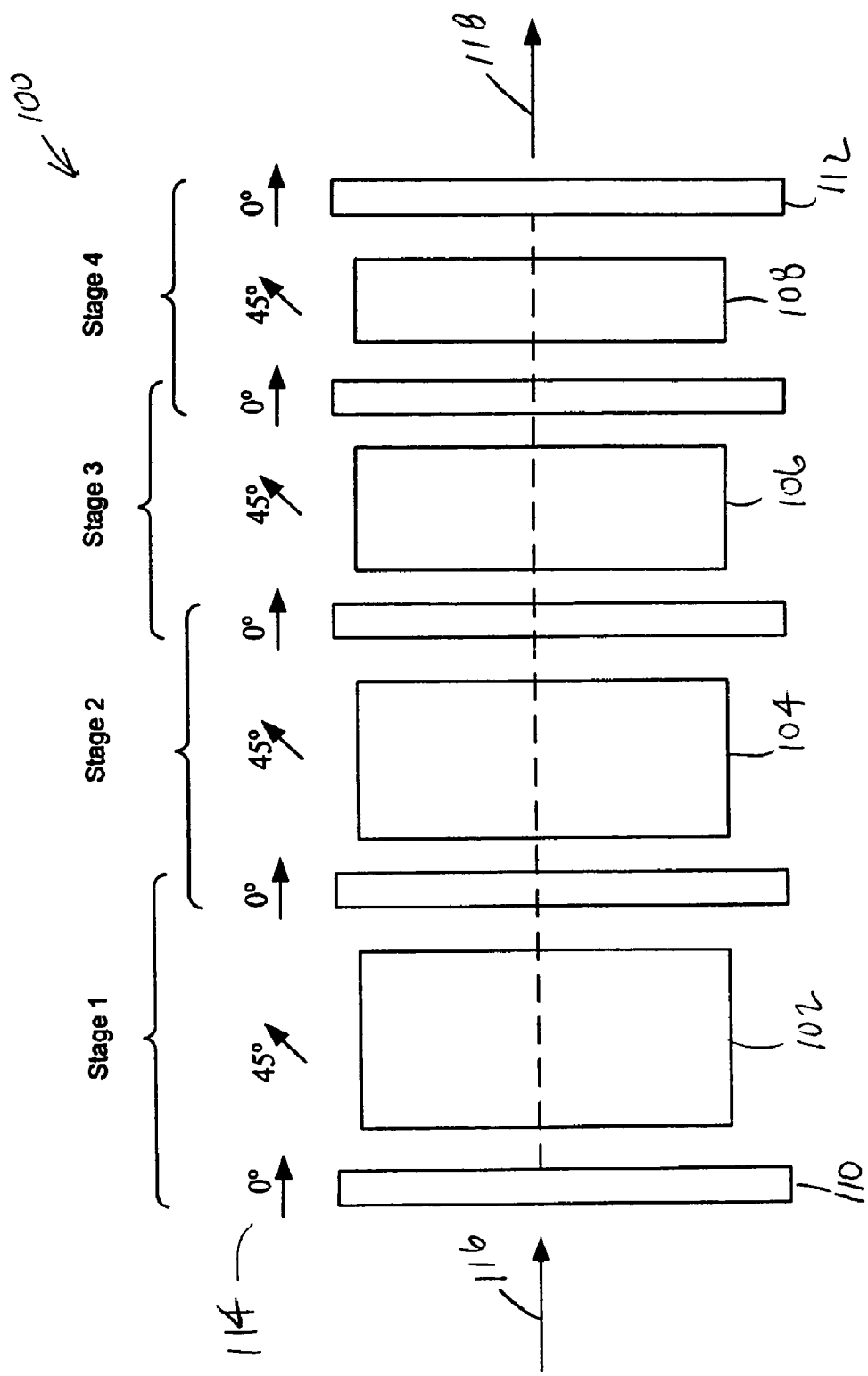
FIG. 1 is a diagrammatic representation of the components which make up an optical filter of the prior art, shown here to illustrate various features of its overall structure.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including alternatives, modifications and equivalents, as defined within the scope of the appended claims. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting. It is noted that like reference numbers may be used to refer to like components throughout the various figures.

In many optics applications, it is desirable to filter light, incident on a detector, so as to spectroscopically resolve the optical frequency content of a given light input over a range of wavelengths or "optical bandwidth". Common detectors, usually electro-optic detectors, used in spectroscopic applications exhibit a response having little or no spectral structure, with only slowly varying and unpronounced spectral features, except perhaps at the ends of the detector range where the spectral response often falls off sharply, so most detectors have little or no ability to resolve optical spectral structure to a wavelength resolution below the functioning optical bandwidth of the detector itself.

An optical filter, on the other hand, is usually designed to produce a spectral response having sharp, pronounced, or well defined spectral features, usually lines or pass bands, depending on the filter, so in many spectroscopy applications, and other optical applications requiring optical wavelength resolution, filters provide the basis for resolving, isolating, or separating the spectral content of an optical light signal, and the detector performs a measurement of optical power present in a selected filter output.

In general, an ideal optical filter would block, absorb or reflect almost all light incident on the filter input while transmitting, at the output, one single desired wavelength, or one arbitrarily narrow or perfectly defined band of wavelengths present in the optical input. In reality, single "stage" filters known in the art often transmit closely spaced multiple narrow lines, or widely spaced lines that are themselves wide.

This is especially true in the case of single stage Lyot optical birefringent filters, which generally exhibit spectral structure characterized by a function of the form sine squared across the entire optical filter bandwidth, so that birefringent filter stages that produce narrow lines also produce closely spaced lines, and filter stages that produce widely spaced lines also produce wide lines. This proportional relationship between line width and line spacing is also true for Solc filter stages although the spacing is larger for a given line width.

Figure 2:
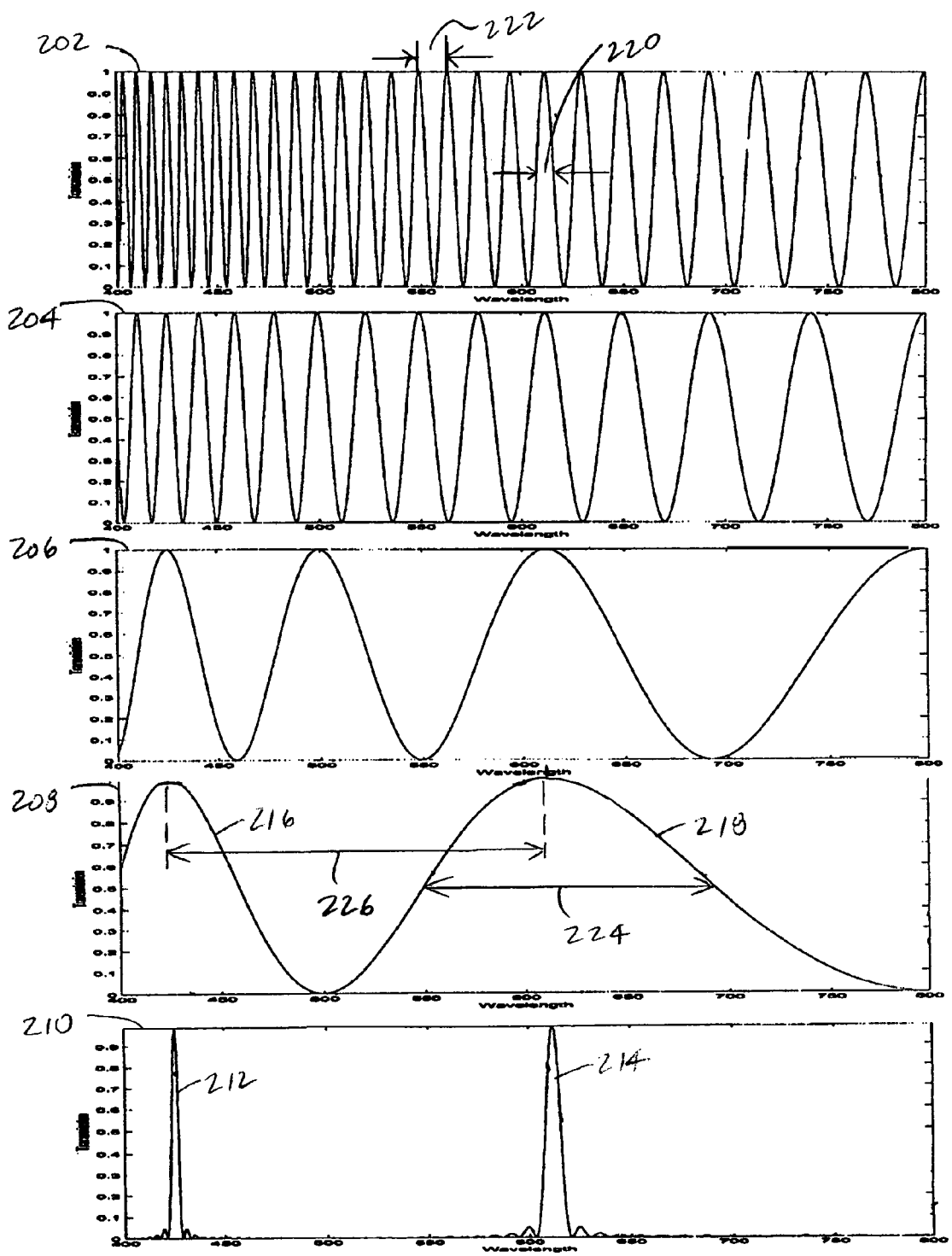
FIG. 2 includes a series of plots of transmission versus wavelength for the stages of the prior art filter of FIG. 1.

The preceding discussion is clarified by again considering the specific multi-stage configuration that was described above with respect to FIG. 2. In particular, overall multi-stage filter response 210 shows the combined response resulting from the product of the individual responses of the four successive individual stages. This response combines the narrow linewidth, low FWHM 220 of the stage 1 response with the high line spacing, or high FSR 226, of the last stage response. Recall that overall filter response 210 of the filter in FIG. 1 combines desired properties of first stage response 202 and last stage response 208 to produce a response with a higher finesse and a lower FWHM than any individual stage in the filter. It is recognized that, although the response of the filter is much improved over the response of any single stage, and may be well-suited for some applications, many applications may require a filter with similar FWHM linewidth, but having an improved finesse sufficient to attenuate one of the two lines of the overall filter response shown in FIG. 2, such that the contribution of the attenuated line to the overall filter response is negligible, at least from a practical standpoint. Moreover, it is often challenging to develop a practical solution that provides sufficiently high finesse for a given application. Various design constraints such as, for example, considerations of size, cost, or optical loss, can work in opposition to the goal of producing the desired FWHM linewidth with the desired finesse.

As an example, it is known to be challenging in the prior art to design and build a compact cost-effective tunable multi-stage birefringent optical filter having a tunable single line response covering the full bandwidth, roughly 400 nm to roughly 1100 mm, of a typical silicon CCD detector; sufficiently challenging, in fact, that others have proposed splitting the optical signal and using multiple filters and detectors to analyze the split beam.

It is submitted that such solutions could be impractical in commercial instruments or commercial products, such as fiber optic instruments or systems, or in aerospace applications, where size and cost-competitiveness are significant issues. In this regard, in many applications, any solutions employing the smallest possible number of added parts or components, may be highly advantageous over such a solution in the prior art. In the particular case of optical birefringent filters, it is desirable to achieve the desired performance goals using the minimum number of polarizers, at least for the reason that polarizers introduce loss. Accordingly, minimizing the number of polarizers is generally equivalent to minimizing the total number of stages, since each stage necessarily includes an additional polarizer.

It is recognized herein that, in many applications, a given detector range is best exploited in a filter system if the filter preceding the detector is adjustably tunable over the full wavelength range of operation for the detector, and the filter exhibits a single line response over the entire detection range. In this regard, other factors including polarizer optical bandwidth, or limited bandwidth on the input wavelength of interest, may set specific limits on the wavelength range of interest. Regardless of the basis of wavelength limitations inherent to an application, it is often desirable to employ a tunable optical filter having a single line response, corresponding to a very high effective finesse, across the entire wavelength range of interest.

The example that is set forth immediately hereinafter, describes the structure and operation of one embodiment of a single element birefringent filter stage for enabling a multi-stage birefringent filter with a widely tunable single-line response over a wide range of wavelengths.

Figure 4:
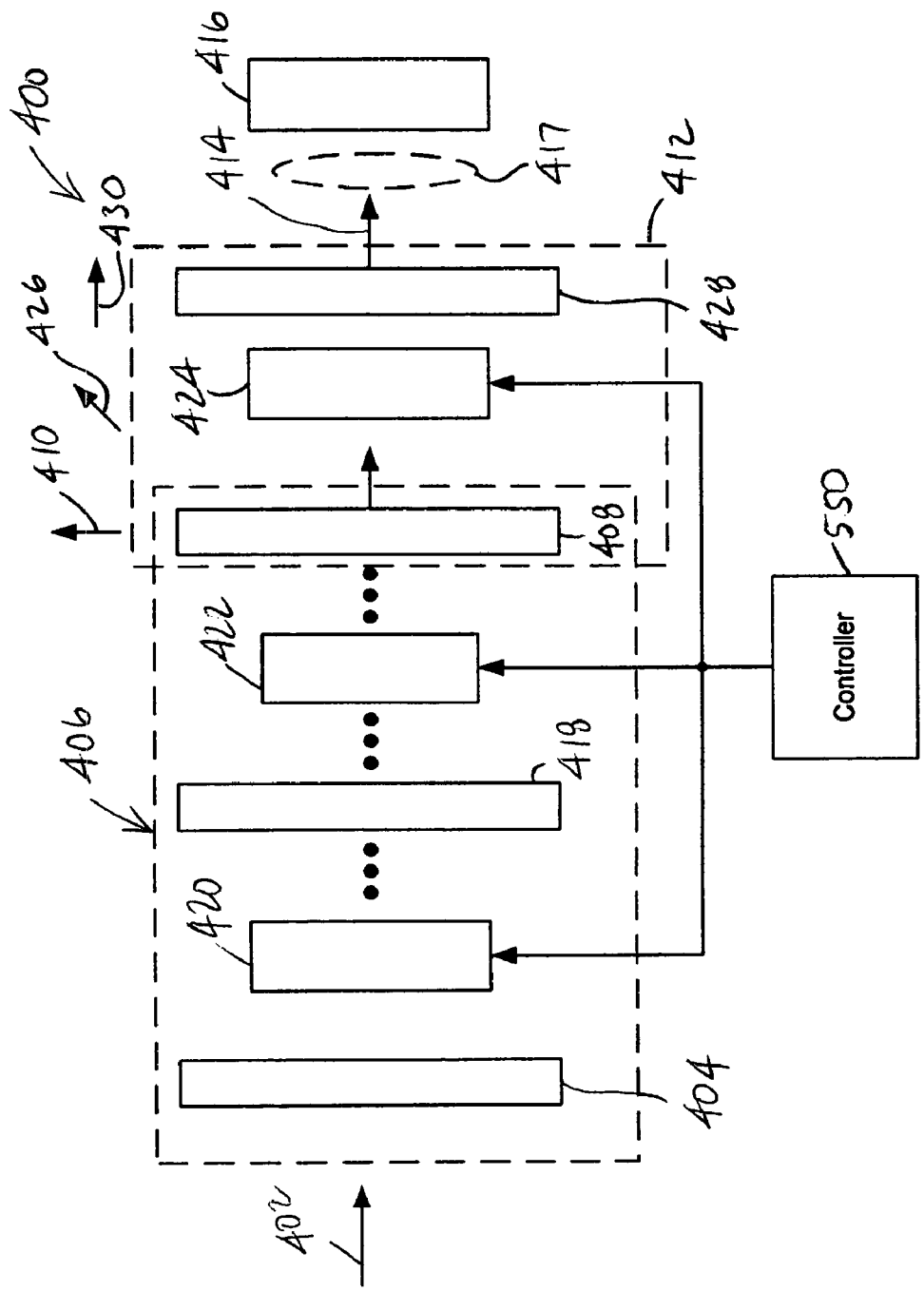
FIG. 4 is a diagrammatic representation of the components of one exemplary embodiment of an optical filter arrangement that is produced according to the present disclosure, which can be tunable, and which includes an add-on stage that provides an optical output to a detector.

Turning now to FIG. 4, a multi-stage filter system is generally indicated by the reference number 400. An input light 402 enters an input polarizer 404 of a generalized multi-stage filter 406 (shown within a dashed line) and exits from an output polarizer 408, with a polarization axis orientation 410. This latter polarizer can be any suitable type of polarizer. The generalized filter can be any filter that provides the contemplated response described hereinafter. An add-on filter stage 412, shown within a dashed line, further filters the light, resulting in a overall filter output 414 for possible collection by an optional electro-optic detector 416, which could be one of many electro-optic detectors including, for example, a silicon CCD device, a germanium device, or an InGaAs detector. It is noted that a lens 417 (shown in phantom using dashed lines) may optionally be provided, if needed.

With continuing reference to FIG. 4, generalized multi-stage filter 406 may consist of two or more successive stages in various possible configurations: that is, it could include 2 or more successive Solc stages, two or more successive Lyot stages, or some other useful combination of birefringent filter stages, each containing one or more adjustable or non-adjustable retarder elements. It should be appreciated that generalized multi-stage birefringent optical filter configurations will generally include at least two polarizers such as, for example, input polarizer 404 and output polarizer 408, and at least one polarizer 418 therebetween, with at least one retarder element 420, 422 in each stage, and wherein the opportunity for additional elements is represented by ellipses between the illustrated elements.

Still referring to FIG. 4, add-on stage 412 (shown within a dashed line) shares output polarizer 408 with multi-stage filter 406 and employs a single retarder element 424, following output polarizer 408, having, at least approximately, a 45 degree orientation 426 relative to output polarizer orientation 410. An additional output polarizer 428 is oriented with a polarization orientation 430 that is oriented at least approximately 90 degrees relative to output polarizer 410 orientation. Output polarizer 408 is a shared polarizer, acting simultaneously as an input polarizer for the add-on stage.

Figure 5:
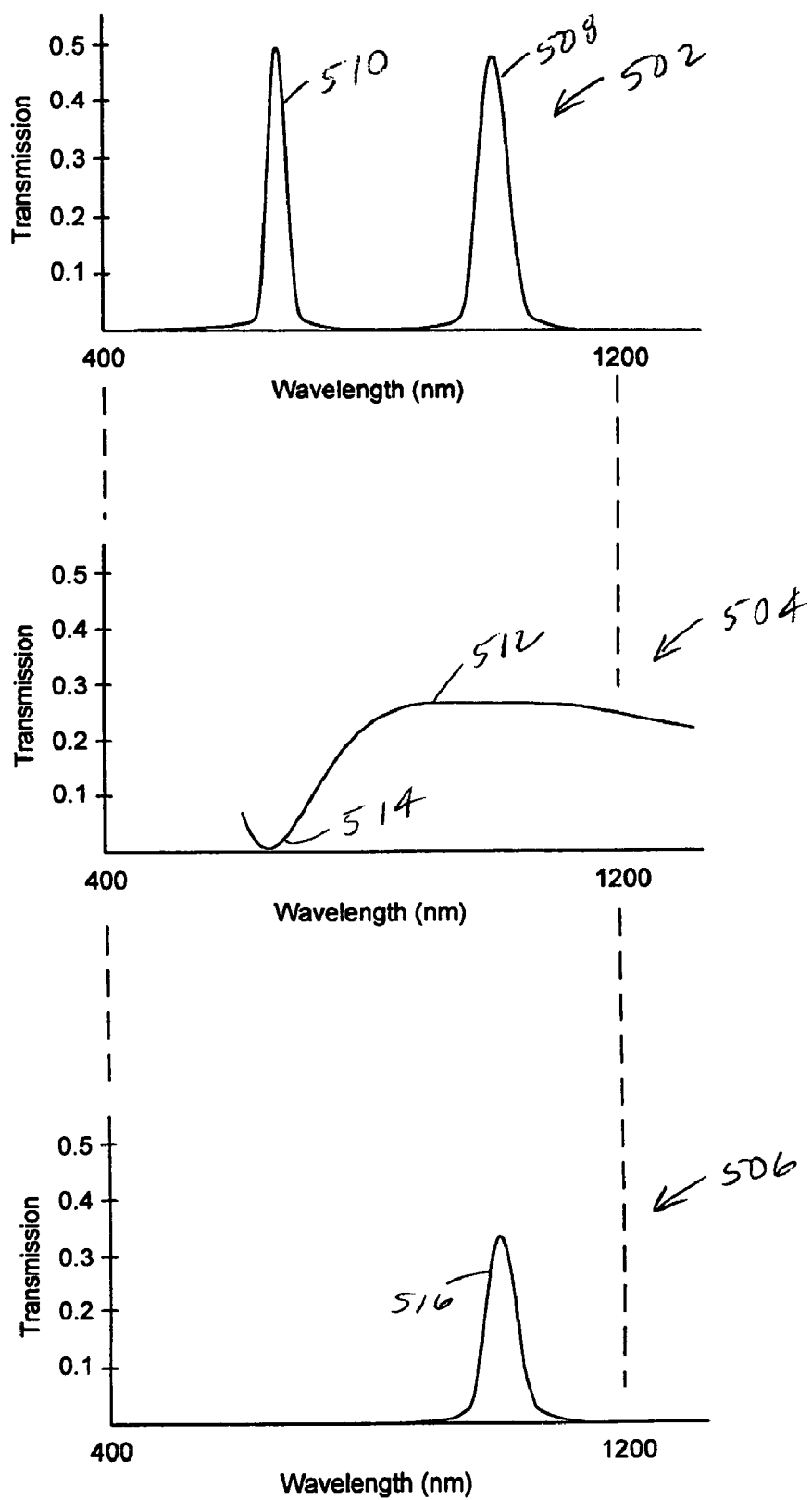
FIG. 5 includes a series of transmission versus wavelength plots corresponding to the optical filter arrangement of FIG. 5 and shown here to illustrate the operation of the add-on stage.

Attention is directed to FIG. 5, which includes a group of three separate response curves 502, 504, and 506 respectively, all of which demonstrate aspects of the response of the filter of FIG. 4, and which are plotted consistently with previous discussions. In particular, response 502 relates to a generalized stage response having a desired first peak 508, and an undesired second peak 510. Response 504 indicates a single stage response of the add-on stage having a desired transmission feature 512, approximately aligned with the desired first peak, and a minimum 514 at least approximately aligned with the undesired second peak. After passing through the add-on stage, light output 414 (FIG. 4) exhibits overall filter response 506 having only a single peak 516. The effect of the add-on stage is to attenuate undesired peak 510, such that the contribution of the attenuated peak to the overall filter response is negligible, at least from a practical standpoint, and to pass desired spectral peak 508, resulting in the overall spectral filter response having a single peak 516, at least from a practical standpoint.

With continuing reference to FIGS. 4 and 5, add-on stage spectral peak 512 can be electrically "tunable", or adjustably moved or shifted in wavelength, by a controller 550, connected to element 424, which, in this case, may be an adjustable LC retarder that is electrically connected to controller 550. Accordingly, a change in voltage results in movement of spectral peak 512. It should be further appreciated that peak locations 508 and 510 of spectral response 502 shown in FIG. 5 of generalized stage 406 in FIG. 4 can similarly be electrically tuned by controller 550 to at least partially "move" or adjust the wavelength across a given wavelength range. It is recognized that this is possible if at least some of the retarder elements in the generalized multi-stage filter are electrically tunable retarders such as, for example, adjustable LC retarder elements.

The example, described above, demonstrates a unique design and method for increasing finesse of a multi-stage tunable birefringent filter, even to a point where a single line can be scanned across an entire wavelength range that is defined by either the limitations of a detector, or some other limitations seen in the filter or the application. Without the teachings in hand, that have been brought to light herein, even using state-of-the-art design techniques, it may not be possible or practical in many cases to achieve the performance described herein. In any case, the approach described above achieves surprising results with a minimum of added size and complexity, and serves as a highly effective optimization tool.

Figure 6:
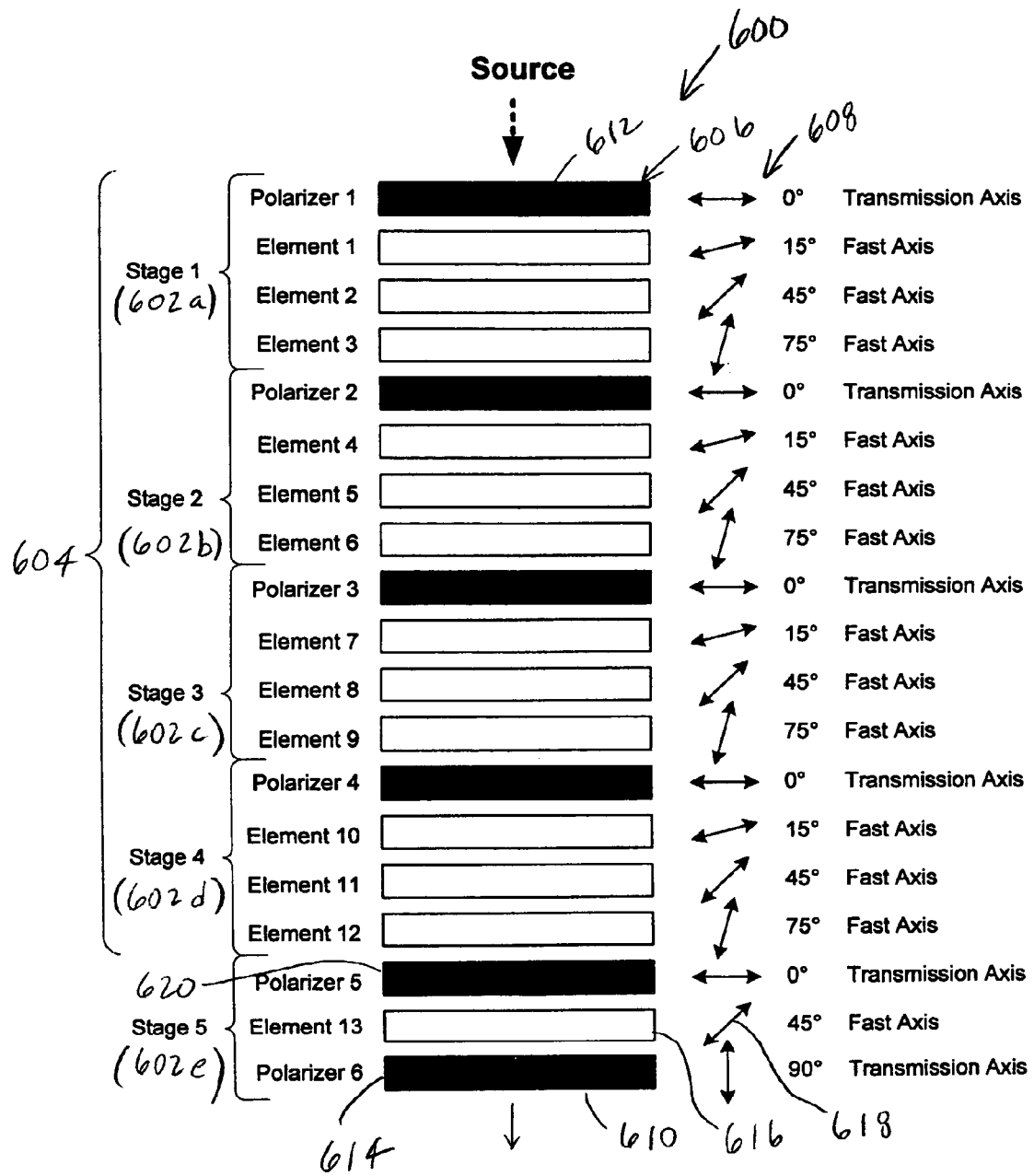
FIG. 6 is a diagrammatic representation of the components of another exemplary embodiment of an optical filter arrangement that is produced according to the present disclosure, which can likewise be tunable, and which includes the add-on stage that is described in further detail below.

Turning now to FIG. 6, a filter arrangement is generally indicated by the reference number 600 and is shown in diagrammatic form, including aspects of functional operation and orientations. Included in the figure are five stages 602a-e. It is noted that stages 1-4 comprise a multi-stage filter in the form of a four stage tunable Solc filter that is designated as 604 and which is followed by an add-on stage 602e, as employed in the previous discussion. For purposes of clarity, stage 602d may be referred to as the "last Solc stage" and stage 602e, the final stage of the filter, may be referred to as the "add-on stage". It is recognized that multi-stage Solc filters have certain benefits (and, conversely, drawbacks) over, for example, multi-stage Lyot filters: multi-stage Solc filters generally require fewer polarizers for achieving the same performance goals, which leads to lower optical loss; multi-stage Solc filters often exhibit superior contrast; and more significantly for tunable multi-stage filters, Solc-based filters often require shorter range of adjustment, or "stroke" in the adjustable retarders.

Despite these advantages, the multi-stage Solc filter, in the next example, nonetheless exhibits an undesired spectral feature that can be eliminated by use of the add-on stage discussed above.

Figure 3:
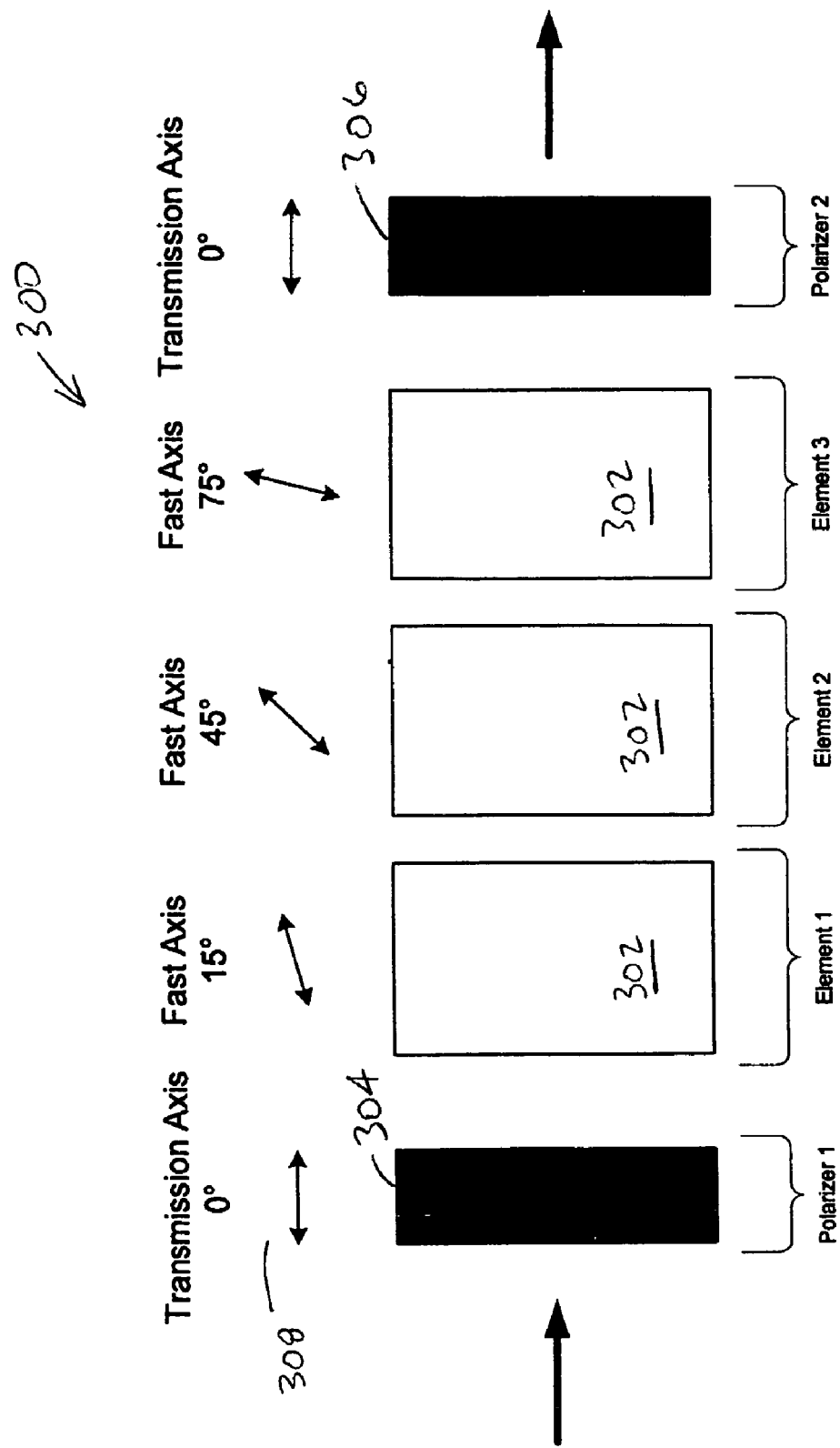
FIG. 3 is a diagrammatic representation of the components which make up another optical filter of the prior art, shown here to illustrate various features of its overall structure.

Continuing to refer to FIG. 6, multi-stage Solc filter 604 includes a plurality of elements 606. Each stage includes a plurality of elements arranged in series as will be familiar to the reader in view of the discussions above. An arrangement of orientation angles 608 is illustrated, as seen by an observer from an overall filter output 610 and looking back towards a filter input 612. The angles of each element in each stage of multi-stage filter 604 are dependent on the number of elements in each stage, and may be determined according to principles known in the art for designing Solc type filter stages, which discussion is beyond the scope of the present application. As in a prior example of the individual Solc stage of FIG. 3, the retarder elements in each individual stage of FIG. 6 are substantially identical to all other retarder elements in that same stage, but the retarder elements differ substantially from stage to stage. With regard to the filter configuration that precedes the add-on stage, it is noted that any suitable configuration may be used, so long as its elements cooperate to at least approximate the response that is described herein.

Still referring to FIG. 6, multi-stage Solc filter 604 is followed by add-on stage 5, which is also designated by reference number 602e, having an additional polarizer 614 in a crossed orientation, at least to an approximation, as discussed in the example above. As before, an adjustable retarder 616 is disposed at least approximately at a 45 degree angle 618 between a polarizer 620, which terminates the Solc multi-stage configuration, and additional polarizer 614.

Figure 7:
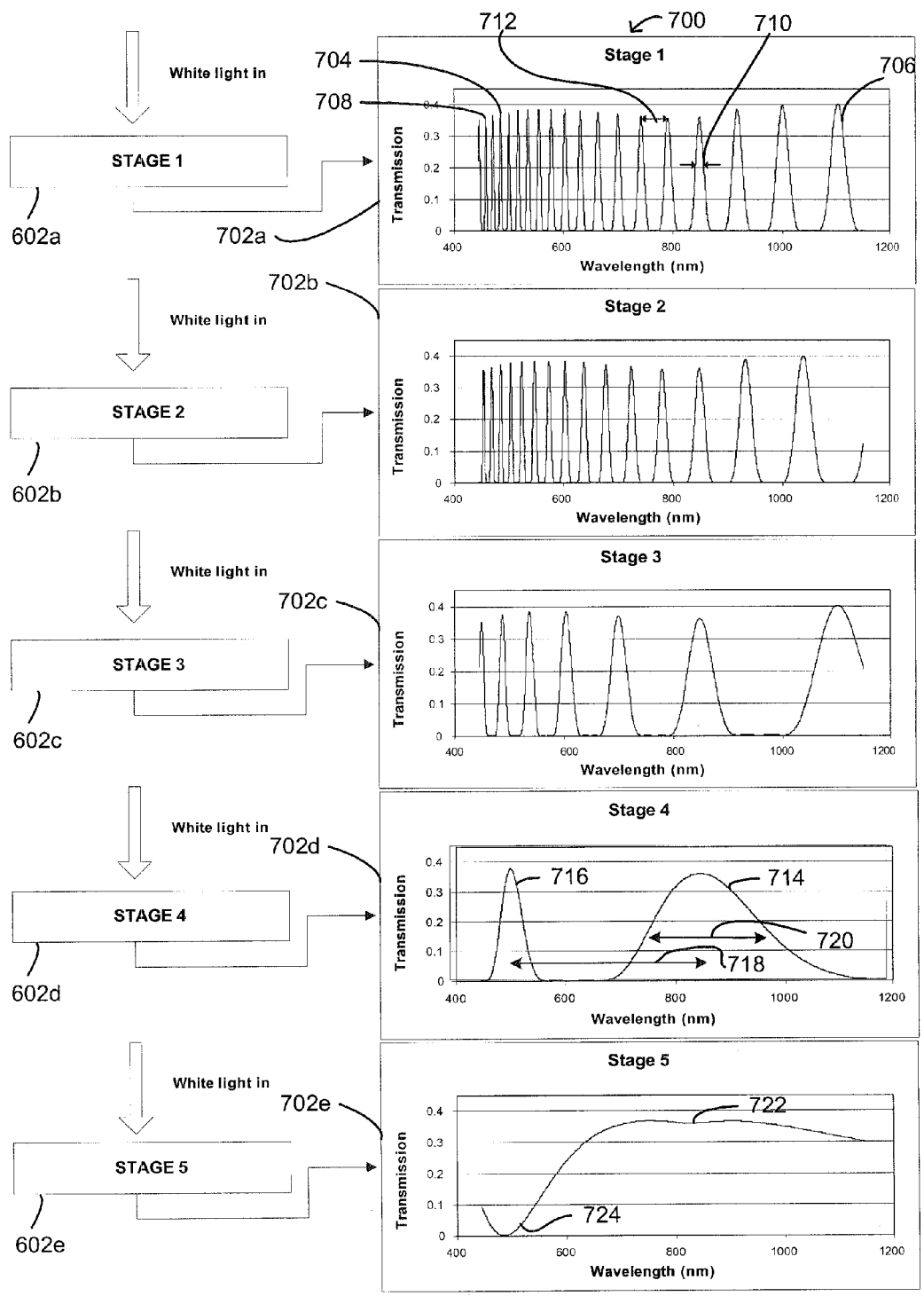
FIG. 7 is a diagrammatic illustration of the transmission versus wavelength response for each stage of the filter of FIG. 6 with respect to white light in a mutually aligned vertical relationship for purposes of demonstrating the manner in which the stages cooperate across a wavelength range of operation.

FIG. 7 is a diagrammatic representation, generally indicated by the reference number 700, of the stages of filter of FIG. 6 immediately along side of their associated individual-stage transmission vs. wavelength response plots. The transmission plots associated with stages 1-5 are individually indicated by the reference numbers 702a-e respectively. It is noted that these plots have been selected for illustrative purposes with respect to their mutual alignment and can shift in wavelength, for example, responsive to the use of different materials. Thus, response 702d may be referred to as the last Solc stage response and response 702e may be referred to as the add-on stage response. Response 702a of stage 1 includes a multiplicity of peaks 704 ranging from a lowest order peak 706 to a highest order peak 708. It is recognized that each of the multiple peaks corresponds to a specific response order. Moreover, the order of a peak corresponds to a specific number of full-wave polarization transformations of the light as it passes though the stage, and the highest order peak corresponds to a higher number of full-wave polarization transformations than the lowest order peak.

With continuing reference to FIG. 7, response 702a of stage 1 is further characterized by an FSR 712 and a FWHM linewidth 710, illustrated with respect to arbitrarily selected peaks. It should be appreciated that the stage 1 response has a lower FSR and a narrower FWHM linewidth than all other individual stage responses of the filter.

Still referring to FIGS. 6 and 7, response 702d of last Solc stage 602d in multi-stage filter 604 of FIG. 6 contains a first order peak 714 and a second order peak 716, generally characterized by an FSR 718, and a linewidth 720. Further, the responses in FIG. 7 illustrate that the last Solc stage response exhibits a higher FSR and a wider FWHM linewidth than other single stage responses of the multi-stage filter. Moreover, the mere fact that the last stage response contains two peaks does not, in and of itself, indicate that the peaks are first and second order peaks, however the high FSR of the stage, as compared to its wavelength range, is generally indicative of low order modes.

Attention is now directed to a response 702e of the add-on stage which includes a one-half order peak 722 and a response minimum 724. In this case, a response of one-half order corresponds to lowest order peak 722 of the add-on stage. It should be appreciated that birefringent filter stages with crossed polarizers exhibit spectral response features or peaks having half integer modes, and that a one-half order mode is the lowest order response of any crossed polarizer stage.

The multi-stage filter discussed in this example utilizes individual stages with successively higher FSR at each stage. The performance goal is to provide a tunable filter that combines the high FSR of the last stage with the narrow FWHM of the first stage. As in the previous example, this is achieved by maintaining a suitably high degree of mutual alignment between the desired output peak with one line of each and every individual stage.

The performance of stages 1-5 is achieved using groups of three substantially identical adjustable retarder elements in each successive stage, having the following approximate center values of retardance, for achieving a center desired line at 825 nm: the add-on stage retarder element has a retardance of one-half the desired wavelength, or 412 nm; the last stage (stage 4) elements each have retardance equal to the desired wavelength, or 825 nm; stage 3 elements all have retardance of three times the desired wavelength, or 2475 nm; stage 2 elements have eight times the wavelength, for a retardance of 6,600 nm in each of all three stage 2 elements; and stage 1 multiplies by 9 for a retardance of 7,425 nm in each and every stage 1 element.

It should be appreciated, as discussed previously, that a common goal in filter design is to provide a suitably high finesse. Although not universally the case, it is very often the case that the most desirable overall filter response is one in which a single line is scanable across the entire wavelength range of the filter. Moreover, it is submitted that one useful filter response, in this particular example, is one in which a single line is scanable across the wavelength range of 400 nm to 1160 nanometers, corresponding at least approximately, in this case, to the entire wavelength range of the filter.

To illustrate and characterize the performance of the filter discussed above, attention is directed to FIG. 8, in conjunction with FIGS. 6 and 7. The former includes a complete set of response plots 800a-e, corresponding to respective ones of stages 1-5, showing a combined filter response at each stage, such that each combined response includes contributions from all previous stages. For example, response plot 800b in the second plot represents the combined response of stage 1 and stage 2. Response plot 800d may be referred to below as the "initial filter response", and response 800e may be referred to below as the "overall filter response". Attention is now directed to response plot 800d, the initial filter response, which represents the combined response of the first four stages, and contains two transmission line features, including an undesired feature 804 and a desired feature 806. The overall output response is shown in a response plot 800e as a single line or feature 808 at least approximately at the desired wavelength.

Figure 8:
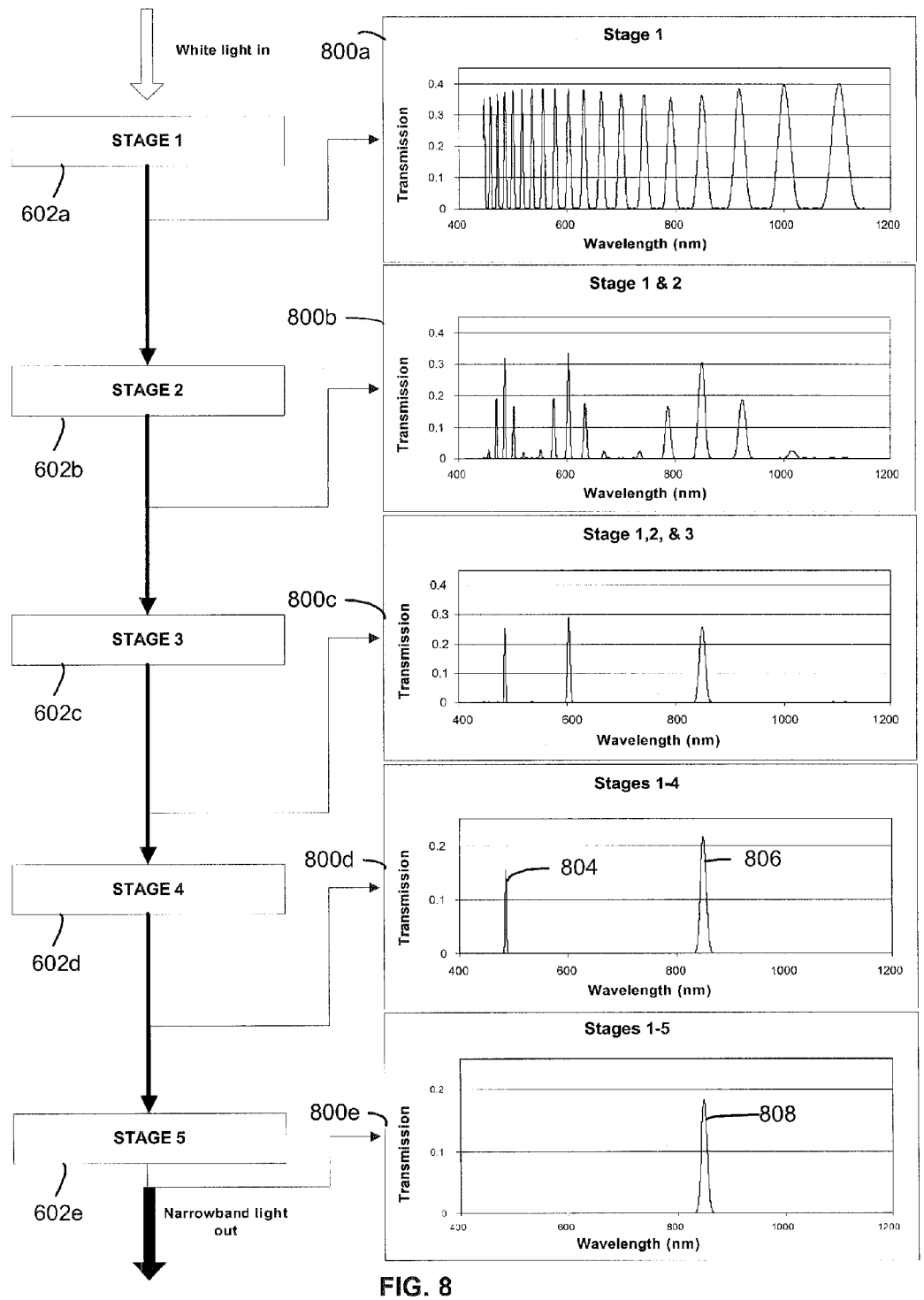
FIG. 8 is a diagrammatic illustration of the cooperative transmission versus wavelength response of the stages of the filter of FIG. 6 with respect to white light, as an input to the first stage, again in a mutually aligned vertical relationship for purposes of demonstrating the manner in which the stages cooperate to produce an overall filter response.

Referring to FIG. 8 in further detail, the initial filter response, prior to filtering by the add-on stage, undesired feature 804 is characterized as a second order line and desired feature 806 is characterized as a first order line. More precisely, this first order line is transmitted through a first order response of the last Solc stage, and the second order line is transmitted through a second order response of the last Solc stage. The add-on stage, in this example, exhibits a peak response of order one-half. It should be appreciated that design variations are possible wherein different combinations of low order modes are cooperatively aligned between the last Solc stage and the add-on stage, depending upon the desired response. It should also be appreciated that, although this example uses Solc stages, the add on stage discussed here can also be used to extend the free spectral range of a filter comprised of a number of Lyot stages.

Based on earlier discussions, it should be appreciated that the overall filter may be tunable over the entire wavelength range, from 400 nm to 1100 nm, but each line in each stage does not require this range of tunability in order to achieve this performance. Recall that for the filter to pass a selected overall filter wavelength, one single peak from each and every stage must at least generally line up with the selected wavelength. As the filter scans through a range of selected wavelengths, each stage requires only the tuning range needed to position one of perhaps multiple peaks at the selected wavelength. It is considered that one of ordinary skill in the art can readily implement the necessary control circuitry with this overall disclosure in hand.

Again turning to FIG. 7 in conjunction with FIG. 6, the individual stages requiring the smallest wavelength range of adjustment are those having the smallest FSR. The tuning method described here is referred to as "peak hopping", so named because in moving from one selected wavelength to another, it is sometimes necessary to switch the response of an individual stage so as to hop from one line to another. It should be appreciated that a given response at a given wavelength may be at least approximately achieved by multiple overall filter states, and there are many possible algorithms for scanning, shifting, or otherwise moving the spectral response, or one or more features of the spectral response, in the filter of the above example.

For the filter design discussed above, the full range of tunability needed to sweep the single line output across the full wavelength range shown, can be achieved using LC retarders having adjustable range as follows and by way of non-limiting example: the add-on stage retarder element includes an adjustable component with a 1000 nm range or "stroke"; and every retarder element in the Solc stages includes a LC retarder, combined with the fixed retarder values listed previously, having approximately 3000 nm retardance.

It should be appreciated that because peak hopping enables a shorter stroke. The elements having high retardance may be formed by combining fixed retarders with adjustable retarders, so the adjustable retarders introduce only the range of adjustment needed for peak hopping. Additionally, it should be recognized that significant discontinuities in the FWHM versus wavelength can be avoided with careful selection of operating parameters for the various LC cells and thicknesses of the waveplates.

Previous discussions have focused on extending the range of tunable bandwidth while still maintaining high finesse, or wide band tunable single-line filter performance. Attention is now turned to the role of polarizers in achieving the widest possible wavelength range of operation for birefringent optical filters. It is recognized herein that polarizers are needed with sufficient optical bandwidth to support the tunable ranges achieved using the structures and methods discussed above.

Birefringent filters known in the art generally utilize "absorptive" polarizers. Absorptive polarizers function by transmitting a desired linear polarization, aligned with a polarization axis that defines the orientation of the polarizer, and linearly polarized light that is not at least approximately aligned with the polarization axis is absorbed. Aside from residual reflectance, at least approximately, all incident light is either transmitted in a linear polarization, or absorbed by the polarizer.

While absorptive polarizers generally function well in birefringent filter applications, operating in their specified wavelength range and optical power limit, they are not adequate for all filter applications. In particular, absorptive polarizers tend not to function properly over the wavelength range extending from visible wavelengths through the infrared wavelengths. For example, in the previously discussed wavelength range of interest, from 400 nm to 1100 nm, known absorptive polarizers tend to exhibit poor performance in either the visible or the infrared, depending on the specific absorptive polarizer used.

While many known absorptive polarizers are designed to exhibit excellent performance in the visible wavelength range, and certain other available absorptive polarizers exhibit good performance over Infrared (IR) wavelengths, the two ranges are covered by distinct and different types of polarizers, each utilizing distinct and different polarizing materials. Currently available absorptive polarizers do not exhibit adequate performance, for use in birefringent filters, over an extended wavelength range covering both the visible and IR. For example, Applicants believe that it is not currently possible to obtain absorptive polarizers with adequate performance over the range of wavelengths from 400 nm to 1100 nm.

Reflective polarizers, exhibiting good IR performance have long been available in the form of wire grid polarizers. Reflective polarizers generally utilize a wire grid pattern, often formed by thin metal deposition followed by lithographic etching, overlaid on a transparent substrate, to selectively reflect one linear polarization while transmitting another, orthogonal linear polarization. Traditional wire grid polarizers do not perform well at visible or shorter wavelengths, since the wire grid pattern, formed using typical manufacturing technology does not yield fine enough spatial resolution. This limitation is related to a need for fine wire spacing, for operation at the comparatively shorter wavelengths present in the visible spectrum.

Furthermore, the use of reflective polarizers, even in IR ranges, where traditional wire grid polarizers provide good polarization performance, is generally avoided in birefringent filter applications. This is especially true in multi-stage filters. Since multi-stage birefringent filters employ multiple serial polarizers, reflected light from any one polarizer may reflect back and forth between the multiple polarizers whilst experiencing, at least potentially, unintended polarization It should be appreciated, from the discussions above, that the cooperation of multiple stages to produce a desired output generally depends at least in part on a very specific sequence of successive polarization transformations occurring between the filter input and the filter output. Any output light that has executed multiple reflections, originating from different polarizers within a multi-stage filter, will at least generally exhibit an output response differing from that of the intended output light, since it has effectively passed through a different sequence of filter stages than the desired or intended output light.

It should be further appreciated that a filter that transmits only one, or only a few narrow spectral lines or features at the output may have rejected a majority of the initial input light that is absent in the output; this is clearly true in cases where a very broad band signal enters a high finesse-filter input. In the case of absorptive polarizers, approximately all rejected light is simply absorbed by polarizers. By contrast, in a system utilizing reflective polarizers approximately all of the light intended to be rejected must necessarily exit the filter either at the input end of the filter or the output end of the filter. Of course, if the rejected light exits at the input end of the filter, it is necessarily separate from the desired transmitted output light, while rejected light that exits at the output end of the filter is of concern, if proper operation is to be achieved. Accordingly, dealing with this rejected light is problematic in the context of using reflective polarizers.

As will be further described, the introduction of a significant amount of rejected light, reflecting multiple times through multiple stages, and from multiple reflective polarizers, in most cases results in degradation of filter performance, since a significant fraction of light intended to be rejected may exit the filter at the output end as unintended light output. It should be appreciated that, even if the unintended light output represents only a small fraction of the input light power, it may represent a large fraction of output optical power, especially when compared to the desired filter response, and could therefore, at least in many applications, result in an unintended electro-optic detector signal that is significant compared to a desired or intended signal, resulting from a desired response.

For the purposes of the discussion hereinafter "multiply reflected" light rays are considered as any light rays which include components resulting from more than one reflection at more than one surface. Consistent with this consideration, we refer to multiply reflected light as any light which includes components of light resulting from multiple reflections from multiple surfaces, beginning with one reflection of light from one reflective polarizer surface. It should be appreciated that in many filter configurations, especially straight-line filter configurations having optical elements disposed along a straight line from input to output, undesired light resulting from polarizer reflections often includes multiply reflected light.

Reflective polarizers have long been available with excellent IR performance, but until fairly recently, within perhaps the last five years, it had not been possible to obtain reflective polarizers having good performance over an extended wavelength range from the visible through the IR. Given that reflective polarizers have traditionally been available in limited bandwidths, and given that birefringent filters known in the art tend to exhibit poor performance using reflective polarizers, there has been little motivation to employ reflective polarizers. Moreover it may appear, at first blush, that reflective polarizers can merely be substituted for absorptive polarizers. Applicants have discovered, however, that such substitution is anything but trivial, as will be described at appropriate points below.

Newly available fine-grid air gap polarizers, developed for use with other unrelated polarizer applications, such as, for example, projectors, provide good performance over an extended wavelength range including the range 400 nm to 1100 nm. The manufacture of these relatively new products is now possible, through improved lithography and deposition techniques, for producing extremely narrow metal strips or "wires" with very close wire spacing as compared to traditional IR range reflective wire grid polarizers. The performance is then further enhanced by etching a concave rut or groove, in the glass substrate, between the thin metal strips, and then rendering yet finer grid spacing. These state-of-the-art polarizers are available through Moxtek, Edmund Optics and Meadowlark Optics®. One suitable product by Meadowlark Optics® is sold under the trade name of VersaLigh™

It is recognized, given the current availability of reflective polarizers having extended wavelength range, that it is highly desirable to produce a multi-stage birefringent filter to incorporate these reflective polarizers in a configuration that eliminates the problems, discussed above, frequently associated with reflective polarizers in birefringent filters. Additionally, it is highly desirable to provide filter designs that at least reduce transmission of polarizer-reflected light, or multiply reflected light resulting from polarizer reflections.

It is further recognized that desired output light transmitted from birefringent filters at least substantially contains light that has been transmitted by multiple polarizers, and that the light rejected by birefringent filters includes light that has been rejected by at least one polarizer within the filter. It should be appreciated that light reflected from reflective polarizers disposed in a birefringent filter, corresponds to light that is desired or intended to be rejected, and so light reflecting from any reflective polarizer in the discussions hereinafter is referred to as "rejected light", or "reflected rejected light".

Figure 9:
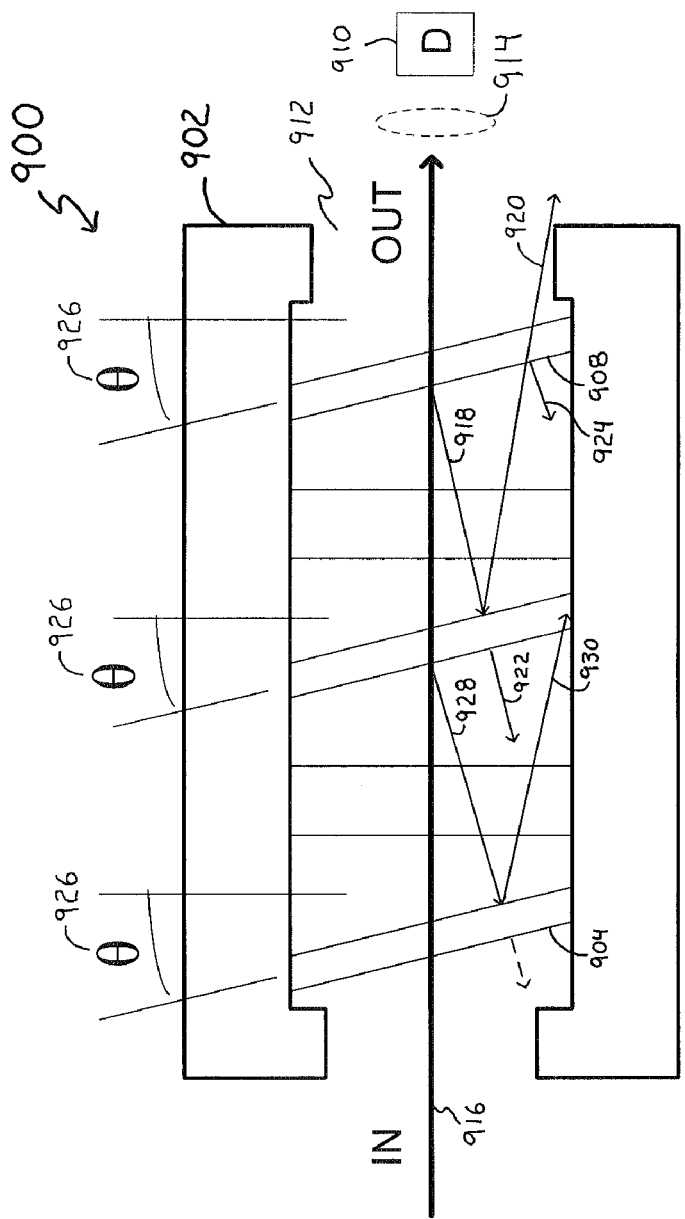
FIG. 9 is diagrammatic illustration of a birefringent optical filter, produced according to the present disclosure, which illustrates the arrangement of a plurality of reflective polarizers and their manner of operation in producing output light for a detector.

Attention is directed to FIG. 9, which depicts a schematic cross section of a birefringent filter, generally indicated by reference number 900. A filter chassis 902 supports a two-stage filter including a group of three reflective polarizers 904, 906 and 908. A detector 910 is shown schematically following a filter output aperture 912, with an optional lens 914 therebetween. A central light ray 916 generally indicates at least the center optical axis of the desired light signal path through the filter. Central ray 916 in FIG. 9 may alternatively be taken to represent a desired input light ray incident on the center of the filter input.

Still referring to FIG. 9, a reflected light ray 918 represents a reflection of rejected light from central light ray 916 and an escaped ray 920 depicts a resulting escaped light ray which contains at least some reflected light from reflected light ray 918. A pair of rays 922 and 924 both represent components from reflected light ray 918 not present in escaped ray 920. It should be appreciated that rays 918, 920, 922 and 924 at least schematically represent light resulting from transmission straight through, or specular reflection from the reflective polarizers, and that the effect of light scattering at polarizer surfaces is not depicted in FIG. 9. It should be further appreciated that these rays are intended for descriptive purposes, in order to enhance the clarity of the present description as well as the understanding of the reader, and are not intended to completely characterize all possible light paths in the example, although it is understood that such paths exist.

It is recognized herein that an angular tilt θ, indicated at 926, in reflective polarizer 908, causes the reflective polarizer to direct reflected light ray 918 away from optical path 916 such that escaped light 920 avoids incidence on detector 910. It should be appreciated, based on the discussion above, that by directing escaped light 920 away from the detector, the influence of light represented by that ray, towards degrading or corrupting the intended filter response, is essentially eliminated.

Still referring to FIG. 9, a reflected ray 928 represents a reflection of rejected light from central light ray 916, and a light ray 930 depicts a ray, containing at least some light from reflected ray 928, incident on the wall of the filter chassis. The resulting blocked ray contains at least some of the light present in reflected ray 928. It should be appreciated, as in the immediately preceding example of the escaped ray, that by preventing incidence of the blocked ray on the detector, the potential signal-degrading influence of the blocked ray is neutralized. The blocked ray is partly scattered, and partly absorbed by the chassis, and while some resulting scattered light exits the filter, the effect on the overall filter output is negligible.

Using ray tracing methods known in the art, any potential input light signal can at least approximately be characterized by a multiplicity of rays, and the response of the filter to a given input light signal can at least approximately be analyzed by ray tracing analysis. It is recognized herein that by tilting reflective polarizers to at least the degree needed so as to avoid incidence on the detector, signal-degrading influence of rejected light reflected from polarizers can be eliminated, at least from a practical standpoint. Moreover, the degrading effect of the reflected light can be substantially eliminated, irrespective of whether the light is blocked by the filter chassis, or whether the light escapes the filter chassis and is directed away from the detector.

Still referring to FIG. 9, and by way of non-limiting example, filter chassis 902 at least generally defines an effective transmission aperture. More specifically, the exemplary arrangement depicted in FIG. 9 includes an effective output aperture approximately defined by opening 912 at an output end of chassis 902. It should be appreciated that the input light ray shown in FIG. 9 represents one of many possible input rays that may be desired in a specific filter application. It is recognized that that the configuration of tilted polarizers, together with the housing geometry, and housing materials, cooperatively determines if a predetermined or predicted input ray avoids incidence on, or transmission through, the effective aperture of the chassis. It is practical, employing known ray tracing art, to configure the filter design, especially with regard to the effective aperture in cooperation with a predetermined direction and degree of tilt in each polarizer, so as to at least substantially block the signal degrading polarizer reflections resulting from one or a group of light input rays, and to prevent incidence on, or transmission through, the effective transmission aperture of a birefringent optical filter. In the description following hereinafter, the effective transmission aperture of the filter may be referred to as simply the "effective aperture", or just the "aperture".

Figures 10A, 10B:
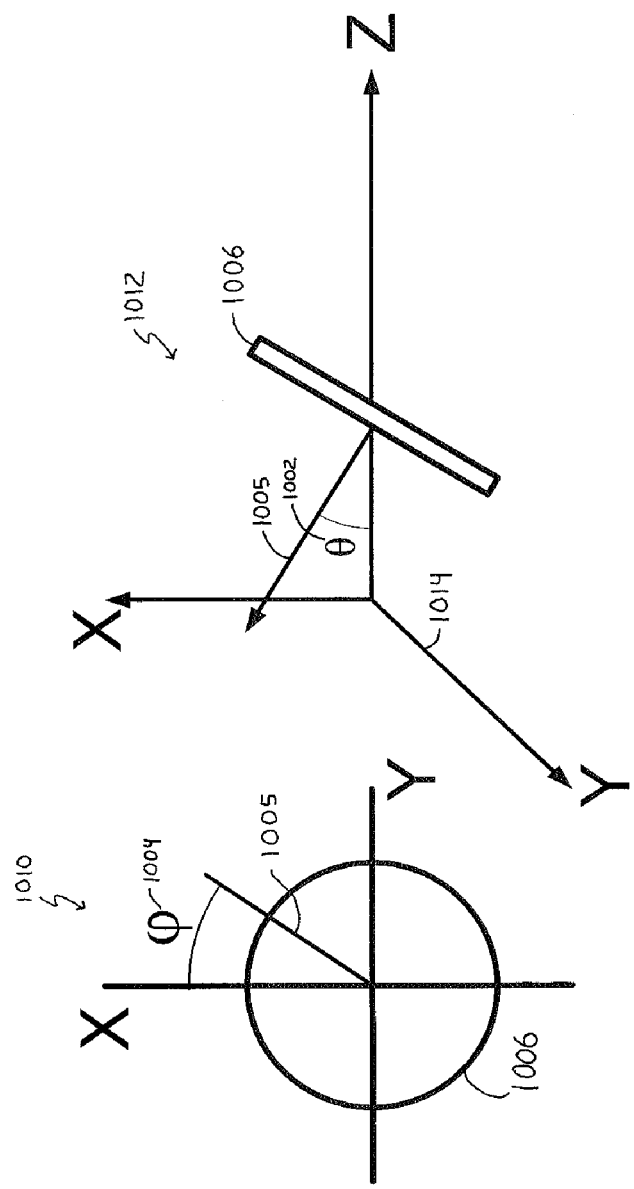
FIGS. 10a and 10b diagrammatically illustrate one exemplary manner in which the orientation of the reflective polarizers, used in any embodiment of this disclosure, can be characterized.

Attention is now directed to FIGS. 10a and 10b, in conjunction with FIG. 9. FIGS. 10a and 10b serve as one possible expedient for defining the angles necessary for describing angular tilt of a polarizer. The view of FIG. 10a is taken as if looking down the optical axis of the figure with the optical path normal to and directed into the plane of the paper. That is FIG. 10a is taken from the viewpoint of an observer positioned at the input of the filter of FIG. 9, and sighting down the filter towards the output. The elevational view, shown in FIG. 10b, depicts a tilted polarizer seen from the same viewpoint as the filter in FIG. 9, with the indicated Z axis defined, relative to the described polarizer orientation, as pointing in the direction corresponding to a ray propagating through a filter from input to output. The angle $\theta$ is defined according to FIG. 10b as the angle between a normal vector 1005, normal to the polarizer surface, and intersecting the Z axis. Angle $\theta$, will be hereinafter referred to as the "tilt angle", since this angle specifies the degree of polarizer tilt away from the optical path, or Z axis. Moreover, the view of FIG. 10a is consistent with the right handed Cartesian coordinates defined in FIG. 10b. The angle $\Phi$ is defined as the azimuthal angle, as rotated about the Z axis or optical path, between the Cartesian X axis of FIGS. 10a and 10b, and a projection onto the X-Y plane of normal vector 1005. This coordinate system is provided for reference purposes by way of non-limiting example.

Taken together, FIGS. 10a and 10b define angles $\theta$ and $\Phi$ used hereinafter to characterize polarizer tilt. For purposes of the following description, the notation ($\theta$, $\Phi$) will be used to designate an angular tilt of a polarizer, according to the definitions set forth in the preceding description. Accordingly, using $\theta$ and $\Phi$, the angular orientation of polarizer 1006 is completely specified with respect to the Z axis which represents the optical path. It is emphasized that these angles are unrelated to the angular orientation of the polarization axis of the polarizer, and are only used designate a polarizer's tilted orientation ($\theta$, $\Phi$) relative to a conventional un-tilted orientation, which would, in the context of this example, be characterized by angular coordinates (0, 0).

Referring again to FIGS. 9, 10a and 10b, in one embodiment, the tilt angles for the reflective polarizers can be further specified as all having at least approximately equal tilt $\theta$, and at least approximately zero rotation $\Phi$. Utilizing the compact notation set forth above, the three polarizers are specified for each one of all three polarizers as tilted in a configuration given by (-$\theta$, 0), where tilt angle $\theta$ is angle 926 in FIG. 9, and of sufficient magnitude to redirect light as in the preceding descriptions.

Referring again to FIG. 9, it is recognized that in this exemplary filter, all three reflective polarizers are tilted in the same direction by at least approximately the same amount. A series of polarizers, including an arbitrary number of polarizers, in this approach, can in general be configured with a specific tilt angle $\theta_1$, and specific rotational orientation $\Phi_1$, for each successive polarizer, as follows: ($\theta_1$, 0), ($\theta_1$, 0), ($\theta_1$, 0) . . . and so on.

Figure 11A:
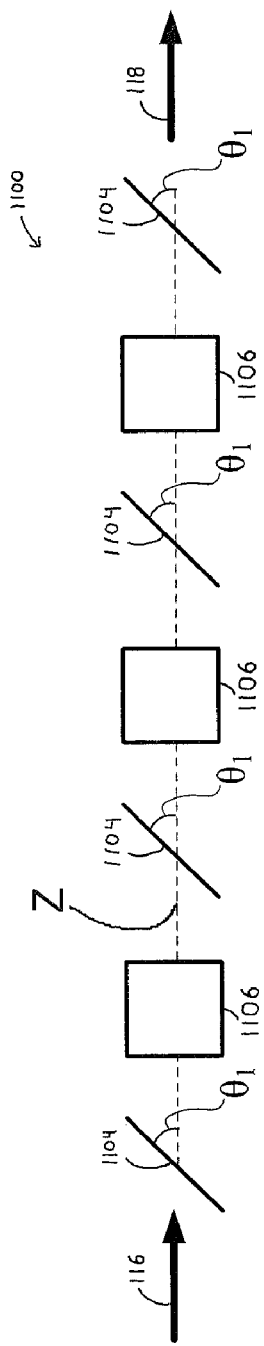
FIG. 11a is a diagrammatic illustration of an arrangement of optical filter components according to FIGS. 10a and 10b, where a plurality of reflective polarizers are arranged at essentially an identical tilt angle with respect to the optical path of the filter.

Attention is now directed to FIG. 11a, in conjunction with FIG. 9, which diagrammatically illustrates an optical component arrangement, generally indicated by the reference number 1100, in an optical birefringent filter, showing, by way of example, a configuration of multiple polarizers, each of which is indicated by the reference number 1104, having at least approximately equal polarizer orientation in the manner just described, with intermediately positioned retarder elements 1106.

Figure 11B:
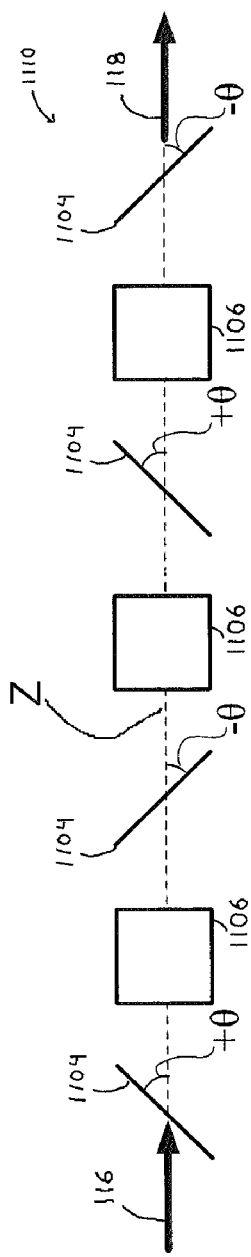
FIG. 11b is a diagrammatic illustration of an arrangement of optical filter components according to FIGS. 10a and 10b, where a plurality of reflective polarizers are arranged at alternating and complementary tilt angles with respect to the optical path of the filter.

Attention is directed to FIG. 11b, which depicts another embodiment of an optical component arrangement that is generally indicated by the reference number 1110 in a birefringent optical filter. A group of polarizers, each of which is again indicated by the reference number 1104, is shown in alternating orientations, with retarder elements 1106 disposed therebetween. A series of polarizers, including an arbitrary number of polarizers, in this embodiment, is configured with tilt angle $\theta$, and rotational orientation $\Phi$ varying at least approximately, for each successive polarizer, as follows: ($\theta$, 0), (+$\theta$, 0), (-$\theta$, 0) . . . where +$\theta$ and -$\theta$ identify a specific angular magnitude of opposing orientation. It is noted that, with respect to the tilt angle, this may be characterized as alternating between +$\theta$ and -$\theta$ This configuration has the potential advantage of directing light away from the desired light path more rapidly than the arrangement depicted in FIG. 9, since mutually opposing tilts can cause the reflected divergence angle of rejected light rays to increase with each successive reflection.

Another possible configuration, with known desirable properties, which has not been shown due to illustrative constraints but which will be readily apparent to the reader, is achieved by increasing $\Phi$ by at least approximately 90 degrees for each successive stage, whilst holding a tilt angle $\theta$ at least approximately constant as in FIG. 11a. A series of polarizers in this approach would be configured with tilt angle $\theta$, and rotational orientation $\Phi$ varying at least approximately, for each successive polarizer, as follows: ($\theta$, $\Phi$), ($\theta$, $\Phi$+1×90), ($\theta$, $\Phi$+2×90), ($\theta$, $\Phi$+3×90) . . . etc.

It is recognized that there are many possible variations for configuring the angular orientation of polarizers in multistage birefringent filters, and that the foregoing descriptions are provided by way of non-limiting example. It is further recognized that tilt angle $\theta$ may vary from polarizer to polarizer within a multi-stage filter. While the configuration of reflective polarizers, for a given filter, will depend on the particular application and overall filter requirements, the desired tilt angle $\theta$ can be at least approximately determined, for many applications, independent of the rotational polarizer configuration, using a few concepts that are described immediately hereinafter. It is noted, however, that even arbitrary or random tilt angles can provide benefits that are contemplated herein.

In many applications, and with no intention to be bound by theory, an at least approximately minimum desired tilt angle θ is thought to be the smallest tilt angle that deflects rejected light away from the desired light path, so as to at least substantially avoid incidence on or inside the outer perimeter of a detector. In general, it may be good practice to tilt each reflective polarizer at a tilt angle at least approximately three or more degrees and in view of the minimum tilt angle determined in the described manner.

In a related approach, the at least approximately minimum desired tilt angle θ is the smallest tilt angle that deflects rejected light away from the desired light path, so as to at least substantially avoid incidence of reflected or multiply reflected light on or inside the outer perimeter of the effective output aperture of the filter.

The immediately preceding discussion addresses an approximate methodology for determining the minimum tilt angle. It is recognized that the maximum tilt angle is some tilt angle for which polarizer performance degrades to an unacceptable degree. It is further recognized that the maximum tilt angle defined in this way may vary from polarizer to polarizer.

It has been observed that the maximum angle defined in this way is larger, typically by at least five degrees or more, for available reflective polarizers, than the minimum tilt angle as at least approximately determined according to previous discussions, at least for many filter designs. It has been further observed that Moxtek reflective polarizers may be set at angles at least five degrees higher than the minimum angle described above with at least approximately no observed degradation in polarizer performance, at least relative to the design requirements of multi-stage filters utilizing Moxtek reflective polarizers over the range 400 nm to 1100 mm. It is noted that the maximum, exemplary tilt may be approximately 10° in order to avoid adversely lengthening the filter stack.

In view of the foregoing description, surprising and unexpected results have been achieved by Applicants which demonstrate sweeping advantages resulting from tilting reflective polarizers in the manner described herein. In an actual implementation, it was observed that tilted reflective polarizers, produced a 5× improvement in contrast relative to similar filters using non-tilted reflective polarizers with a three degree tilt of the reflective polarizers having a common orientation. This remarkable and unexpected result can, in part, be described by comparing contrast, defined as the ratio of observed energy in transmission pass band divided by observed energy leaking through the filter at all other wavelengths to which the electro-optic detector is sensitive.

It is submitted that those of ordinary skill in the art have been motivated to maintain a polarizer orientation that places the plane of the polarizer parallel to the retarder face or liquid crystal layer, even in the instance of the use of a reflective polarizer.

Although each of the aforedescribed physical embodiments have been illustrated with various components having particular respective orientations, it should be understood that the present invention may take on a variety of specific configurations with the various components being located in a wide variety of positions and mutual orientations. Furthermore, the methods described herein may be modified in an unlimited number of ways, for example, by reordering the various sequences of which they are made up. Accordingly, having described a number of exemplary aspects and embodiments above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A multi-stage birefringent optical filter that produces an overall light output signal from an input light, said filter, comprising:

an arrangement of optical elements, configured to form an initial multi-stage filter having at least two filter stages, including a plurality of polarizers, each having a polarization axis, with one of said polarizers serving as an input polarizer and another one of said polarizers serving as an output polarizer, having said polarization axis of the output polarizer in a given orientation, and at least one retarder element positioned between the input polarizer and the output polarizer such that the arrangement of optical elements cooperates to define an optical path along which at least said input light travels from an optical input to an initial optical output to exhibit an initial spectral filter response which produces an initial optical output that exhibits a desired transmission feature and an undesired transmission peak;

an additional polarizer following said output polarizer, said additional polarizer having an additional polarization axis that is oriented at least approximately orthogonal to said given orientation; and an adjustable retarder, as a sole optical element, disposed directly between said output polarizer and said additional polarizer to cooperate with said output polarizer and said additional polarizer, as an add-on stage, to receive said initial optical output from said optical path and to produce therefrom an overall spectral filter response that at least generally eliminates said undesired transmission peak from said overall light output signal, while passing the desired transmission feature.

2. The filter of claim 1 wherein said adjustable retarder includes a fixed retarder section and an adjustable retarder section.

3. The filter of claim 1 wherein the polarization axis of each polarizer of said plurality of polarizers is arranged, at least approximately, parallel to said given orientation of the polarization axis of said output polarizer in a mutually parallel orientation.

4. The multi-stage birefringent optical filter of claim 1 wherein said initial multi-stage filter has a last stage that exhibits a last stage spectral filter response and which emits said initial optical output, including at least one stage aligned in a Lyot configuration, and each of said stages is separated from another of said stages by one of said plurality of polarizers, and said last stage spectral filter response includes a first transmission peak at a first wavelength and a second transmission peak at a second wavelength, with said second transmission peak corresponding to said undesired transmission peak, and said output polarizer, said adjustable retarder and said additional polarizer cooperate, as said add-on stage, to produce a second filter response that is characterized by a second spectral filter response of order one half at the wavelength of the desired first transmission peak, that is spectrally positioned with respect to said initial spectral filter response to substantially pass the desired, first transmission peak and to substantially attenuate said second transmission peak from said overall spectral filter response.

5. The multi-stage birefringent optical filter of claim 1 wherein said initial multi-stage filter has a last stage that exhibits a last stage spectral filter response and which emits said initial optical output, each stage including at least three of said retarder elements with said retarder elements aligned in a Solc configuration, and each of said stages is separated from another of said stages by one of said plurality of polarizers, and said last stage spectral filter response includes a first transmission peak at a first wavelength and a second transmission peak at a second wavelength, with said second transmission peak corresponding to said undesired transmission peak, and said output polarizer, said adjustable retarder and said additional polarizer cooperate, as said add-on stage, to produce a second filter response that is characterized by a second spectral filter response of order one half at the wavelength of the desired first transmission peak, that is spectrally positioned with respect to said initial spectral filter response to substantially pass the desired, first transmission peak, and to substantially attenuate said second transmission peak from said overall spectral filter response.

6. The multi-stage birefringent optical filter of claim 4 wherein said first transmission peak is characterized by the last stage spectral filter response order of one and said second transmission peak is characterized by the last stage spectral filter response of order two.

7. The multi-stage birefringent optical filter of claim 1, for use with an electro-optic detector having a given detection range of operation, in wavelength, and wherein
said initial multi-stage filter is configured for selectively moving said desired transmission feature and said undesired transmission peak across said given detection range, and
said output polarizer, said adjustable retarder and said additional polarizer cooperate, as said add-on stage, to produce an add-on spectral filter response that operates to pass said desired transmission feature at an add-on stage transmission peak of said add-on spectral filter response and to attenuate said undesired transmission peak at least approximately at a minimum of said add-on spectral filter response, for any given position of the desired transmission feature, and said add-on stage is operable over said given detection range of operation such that said desired transmission feature is adjustably tunable thereacross, while substantially eliminating the undesired transmission feature to selectively, spectrally align the add-on spectral filter response with the initial spectral filter response.

8. The multi-stage birefringent optical filter of claim 7 wherein said add-on stage transmission peak is a one-half order response at the wavelength of said add-on stage transmission peak.

9. The multi-stage birefringent optical filter of claim 7 wherein said add-on stage transmission peak is a three-halves order response at the wavelength of said add-on stage transmission peak.

10. The multi-stage birefringent optical filter of claim 7 wherein said electro-optic detector is a silicon detector.

11. The multi-stage birefringent optical filter of claim 7 wherein said electro-optic detector is a germanium detector.

12. The multi-stage birefringent optical filter of claim 7 wherein said electro-optic detector is a InGaAs detector.

13. The multi-stage birefringent filter of claim 7 wherein said given detection range is at least approximately 400 nm to 1100 nm in wavelength.

14. A system, comprising:
an electro-optic detector having a given detection range of operation, in wavelength; and
the multi-stage birefringent optical filter of claim 1 wherein
said initial multi-stage filter is configured for moving said desired transmission feature and said undesired transmission peak across said given detection range, and
said output polarizer, said adjustable retarder and said additional polarizer cooperate, as said add-on stage, to produce an add-on spectral filter response that operates to pass said desired transmission feature at an add-on stage transmission peak of said add-on spectral filter response and to attenuate said undesired transmission peak at a minimum of said add-on spectral filter response for any given position of the desired transmission feature and said add-on stage is operable over said wavelength range of operation such that said add-on spectral filter response is adjustably tunable across said given detection range.

15. A method for producing a multi-stage birefringent optical filter which produces an overall light output signal from an input light, said method comprising:
providing an initial multi-stage filter having at least two stages and including an arrangement of optical elements including a plurality of polarizers, each having a polarization axis with one of said polarizers serving as an input polarizer and another one of said polarizers serving as an output polarizer, having said polarization axis of the output polarizer in a given orientation, and at least one retarder element positioned between the input polarizer and the output polarizer such that the arrangement of optical elements cooperates to define an optical path along which at least said input light travels from an optical input to an initial optical output to exhibit an initial spectral filter response which produces an initial optical output that exhibits an undesired transmission peak and a desired transmission feature;
positioning an additional polarizer to follow said output polarizer, said additional polarizer having an additional polarization axis;
orienting the additional polarization axis at least approximately orthogonal to said given orientation; and
arranging an adjustable retarder, as a sole optical element, disposed directly between said output polarizer and said additional polarizer to cooperate with said output polarizer and said additional polarizer, as an add-on stage, to receive said initial optical output from said optical path and to produce therefrom an overall spectral filter response that at least generally eliminates said undesired transmission peak from said overall light output signal, while passing the desired transmission feature.

16. The method of claim 15 including configuring said adjustable retarder to include a fixed retarder section and an adjustable retarder section.

17. The method of claim 15 including arranging the polarization axis of each polarizer of said plurality of polarizers at least approximately parallel to said given orientation of the polarization axis of said output polarizer in a mutually parallel orientation.

18. The method of claim 15 including configuring said initial multi-stage filter with a last stage that exhibits a last stage spectral filter response and which emits said initial optical output, each stage including at least three of said retarder elements with said retarder elements aligned in a Solc configuration, and each of said stages is separated from another of said stages by one of said plurality of polarizers, and said last stage spectral filter response includes a first transmission peak at a first wavelength and a second transmission peak at a second wavelength, with said second transmission peak corresponding to said undesired transmission peak, and further configuring said output polarizer, said adjustable retarder and said additional polarizer to cooperate, as said add-on stage, to produce a second filter response that is characterized by a second spectral filter response of order one half at the wavelength of the desired first transmission peak, that is spectrally positioned with respect to said initial spectral filter response to substantially attenuate said second transmission peak in said overall spectral filter response while substantially passing the desired, first transmission peak.

19. The method of claim 18 wherein said first transmission peak is characterized by the last stage spectral filter response order of one and said second transmission peak is characterized by the last stage filter response of order two.

20. The method of claim 15 including configuring said initial multi-stage filter with a last stage that exhibits a last stage spectral filter response and which emits said initial optical output, including at least one stage aligned in a Lyot configuration, and each of said stages is separated from another of said stages by one of said plurality of polarizers, and said last stage spectral filter response includes a first transmission peak at a first wavelength and a second transmission peak at a second wavelength, with said second transmission peak corresponding to said undesired transmission peak and further configuring said adjustable retarder and said additional polarizer to cooperate, as said add-on stage, to produce a second filter response that is characterized by a second spectral filter response of order one half at the wavelength of the desired first transmission peak, that is spectrally positioned with respect to said initial spectral filter response to substantially pass the desired, first transmission peak and to substantially attenuate said second transmission peak from said overall spectral filter response.

21. The method of claim 15 further comprising:
configuring said multi-stage filter for selectively moving said first transmission feature and said second transmission feature across said given detection range characterized by an electro-optic detector having a given detection range of operation, in wavelength; and
causing said output polarizer, said adjustable retarder and said additional polarizer to cooperate, as said add-on stage, to produce an add-on spectral filter response that operates to pass said desired transmission feature at an add-on stage transmission peak of said add-on spectral filter response and to attenuate said undesired transmission peak at least approximately at a minimum of said add-on spectral filter response, for any given position of the desired transmission feature, and said add-on stage is operable over said given detection range of operation such that said desired transmission feature is adjustably tunable thereacross, while substantially eliminating the undesired transmission peak to selectively, spectrally align the add-on spectral filter response with the initial spectral filter response.

22. The method of claim 21 including configuring said add-on stage transmission peak as a one-half order response at the wavelength of said add-on stage transmission peak.

23. The method of claim 21 including configuring said add-on stage transmission peak as a three-halves order response at the wavelength of said add-on stage transmission peak.

24. The method of claim 23 wherein said given detection range is at least approximately 400 nm to 1100 nm in wavelength.

25. A birefringent optical filter, comprising:
an arrangement of optical elements including a plurality of polarizers with one of said polarizers serving as an input polarizer and another one of said polarizers serving as an output polarizer and at least one retarder element positioned between the input polarizer and the output polarizer such that the arrangement of optical elements cooperates to define an optical path along which at least input light travels from an optical input to an optical output to produce an output light; and
at least one reflective polarizer, serving as one of said plurality of polarizers, is arranged in said optical path for passing light along the optical path, which light is characterized by a selected polarization, and for reflecting a rejected light that is characterized by a different polarization such that the rejected light is directed out of the optical path.

26. The birefringent optical filter of claim 25 wherein said arrangement of optical elements is characterized, at least in part, by an effective output aperture which limits passage of said output light to within a predetermined effective aperture size and shape, and said reflective polarizer is arranged in a tilted orientation, with respect to said optical path, to substantially avoid transmission of said rejected light through said effective output aperture.

27. The birefringent optical filter of claim 26 wherein said rejected light further reflects at least partially from at least one different one of said optical elements to produce at least one secondary reflection, resulting in a multiply reflected light, and said tilted orientation causes said multiply reflected light to fall outside of said effective output aperture.

28. The birefringent optical filter of claim 27 wherein
said arrangement of optical components includes at least two reflective polarizers, including a first reflective polarizer and a second reflective polarizer, with said first reflective polarizer serving as the reflective polarizer aforesaid and said secondary reflection is produced by said rejected light that is incident on the second reflective polarizer to generate said multiply reflected light, and
said reflective polarizers are arranged with adjacent ones of the reflective polarizers oriented at one or more tilt angles such that said multiply reflected light, produced by the second reflective polarizer, is directed away from said optical path.

29. The birefringent optical filter of claim 28 wherein the tilt angles include a first tilt angle and a second, opposing and complementary tilt angle such that successive ones of the reflective polarizers are alternatingly positioned at the first tilt angle and then the second tilt angle.

30. The birefringent optical filter of claim 28 wherein a selected tilt angle is used for all of said reflective polarizers.

31. An optical system, comprising:
the optical filter of claim 25 including a plurality of said reflective polarizers wherein each reflective polarizer is arranged in a tilted orientation with respect to said optical path; and
an electro-optic detector configured to detect at least some of said output light at said optical output and wherein said tilted orientation of the reflective polarizer avoids an incidence of said rejected light on the electro-optic detector.

32. The birefringent optical filter of claim 31 wherein said plurality of polarizers includes a plurality of reflective polarizers having each successive one of the reflective polarizers arranged at a complementary, opposing tilt angle with respect to an immediately preceding one of the reflective polarizers.

33. The birefringent optical filter of claim 31 wherein said plurality of polarizers includes a plurality of reflective polarizers having all of the reflective polarizers arranged at a selected tilt angle.

34. A method, comprising:
configuring an arrangement of optical elements to include a plurality of polarizers with one of said polarizers serving as an input polarizer and another one of said polarizers serving as an output polarizer and at least one retarder element positioned between the input polarizer and the output polarizer such that the arrangement of optical elements cooperates to define an optical path along which at least input light travels from an optical input to an optical output to produce an output light; and arranging at least one reflective polarizer in said optical path to serve as one of said plurality of polarizers for passing light along the optical path, which light is characterized by a selected polarization, and for reflecting a rejected light that is characterized by a different polarization such that the rejected light is directed out of the optical path.

35. The method of claim 34 wherein said arrangement of optical elements is characterized, at least in part, by an effective output aperture which limits passage of said output light to within a predetermined effective aperture size and shape, and said method includes tilting said reflective polarizer to a tilted orientation, with respect to said optical path, to substantially avoid transmission of said rejected light through said effective output aperture.

36. The method of claim 35 wherein said rejected light further reflects at least partially from at least one different one of said optical elements to produce at least one secondary reflection, resulting in a multiply reflected light, and said tilted orientation causes said multiply reflected light to fall outside of said effective output aperture.

37. The method of claim 36 including
providing at least two reflective polarizers in said arrangement of optical components where a first reflective polarizer serves as the reflective polarizer aforesaid and a second one of said reflective polarizers serves as the different one of said optical elements to produce said secondary reflection as the multiply reflected light, and
arranging said reflective polarizers with adjacent ones of the reflective polarizers oriented at tilt angles such that said multiply reflected light, produced by the second reflective polarizer, is directed away from said optical path.

38. The method of claim 37 wherein the tilt angles include a first tilt angle and a second, opposing and complementary tilt angle such that successive ones of the reflective polarizers are alternatingly positioned at the first tilt angle and then the second tilt angle.

39. The method of claim 37 wherein the tilt angles for all of said reflective polarizers is selected as at least approximately identical.

40. The method of claim 34 further comprising:
arranging said reflective polarizer in a tilted orientation with respect to said optical path; and
positioning an electro optic-detector to detect at least some of said output light at said optical output such that said tilted orientation of the reflective polarizer avoids an incidence of said rejected light on the electro-optic detector.

41. The method of claim 40 wherein said plurality of polarizers includes a plurality of reflective polarizers having each successive one of the reflective polarizers arranged at a complementary, opposing tilt angle with respect to an immediately preceding one of the reflective polarizers.

42. The multistage birefringent filter of claim 1 wherein said initial multistage filter is configured such that said undesired transmission peak has a magnitude that is comparable to said desired transmission feature, and said add-on stage is configured for passing said desired transmission feature such that said desired transmission feature in said overall spectral filter response has a linewidth that is approximately the same as compared to the linewidth of said desired transmission feature in said initial filter response.

43. The multistage birefringent filter of claim 42 wherein said add-on stage and said initial multi-stage filter are cooperatively configured such that (i) said initial spectral filter response exhibits an initial FSR based in part on a spectral separation between said desired transmission feature and said undesired transmission peak, (ii) the elimination of the undesired transmission peak causes said overall spectral filter response to exhibit an overall FSR that is extended as compared to said initial FSR, and (iii) said add-on stage is configured for passing said desired transmission feature such that said desired transmission feature in said overall spectral filter response has a linewidth that is approximately the same as compared to the linewidth of said desired transmission feature in said initial filter response.

44. The multistage birefringent filter of claim 1 wherein said output polarizer, said adjustable retarder, and said additional polarizer cooperate, as said add-on stage, to produce a second filter response that has a low order such that said add-on stage passes said desired transmission feature without substantially modifying the desired transmission feature, and the desired transmission feature in said overall spectral filter response has a linewidth that is approximately the same as compared to the linewidth of said desired transmission feature in said initial filter response.

45. The multistage birefringent filter of claim 44 wherein the second filter response has the order 1/2.

46. The multistage birefringent filter of claim 44 wherein the second filter response has the order 3/2.

47. The multistage birefringent filter of claim 1 wherein said initial multi-stage filter is configured such that said undesired transmission peak has a magnitude that is larger as compared to the magnitude of said desired transmission feature.

48. The multistage birefringent filter of claim 1 wherein said initial multi-stage filter is configured such that said initial optical output consists essentially of said desired transmission feature and said undesired transmission peak.

49. The method of claim 15 wherein providing the arrangement of optical elements includes (i) configuring the initial multi-stage filter such that said undesired transmission peak has a peak magnitude that is comparable to a magnitude of said desired transmission feature and (ii) configuring said add-on stage for passing said desired transmission feature such that said desired transmission feature in said overall spectral filter response has a linewidth that is approximately the same as compared to the linewidth of said desired transmission feature in said initial filter response.

50. The method of claim 15 wherein providing the arrangement of optical elements includes
configuring the initial multi-stage filter such that said initial spectral filter response exhibits an initial FSR based in part on a separation between said desired transmission feature and said undesired transmission peak, and
further configuring said add-on stage for (i) passing said desired transmission feature such that said desired transmission feature in said overall spectral filter response has a linewidth that is approximately the same as compared to a linewidth of said desired transmission feature in said initial filter response, and (ii) eliminating the undesired transmission peak such that the overall spectral filter response to exhibits an overall FSR that is extended as compared to said initial FSR.

51. The method of claim 15 including arranging said output polarizer, said adjustable retarder, and said additional polarizer cooperate, as said add-on stage, to produce a second filter response that has a low order for passing said desired transmission feature without substantially modifying the desired feature such that the desired transmission feature in said overall spectral filter response has a linewidth that is approximately the same as compared to the linewidth of said desired transmission feature in said initial filter response.

52. The method of claim 48 including configuring said add-on stage such that the second filter response has the order 1/2.

53. The method of claim 48 including configuring said add-on stage such that the second filter response has the order 3/2.

54. The method of claim 15 including further configuring said initial multi-stage filter such that said undesired transmission peak has a magnitude that is larger as compared to the magnitude of said desired transmission feature.

55. The method of claim 15 including further configuring said initial multi-stage filter such that said initial optical output consists essentially of said desired transmission feature and said undesired transmission peak.

* * * * *